US010375381B2

(12) United States Patent
Esteban et al.

(10) Patent No.: US 10,375,381 B2
(45) Date of Patent: *Aug. 6, 2019

(54) OMNISTEREO CAPTURE AND RENDER OF PANORAMIC VIRTUAL REALITY CONTENT

(71) Applicant: GOOGLE LLC, Mountain View, CA (US)

(72) Inventors: Carlos Hernandez Esteban, Kirkland, WA (US); Robert Anderson, Seattle, WA (US); Changchang Wu, Mountain View, CA (US); Michael Krainin, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/843,366

(22) Filed: Dec. 15, 2017

(65) Prior Publication Data
US 2018/0160106 A1 Jun. 7, 2018

Related U.S. Application Data

(63) Continuation of application No. 14/723,178, filed on May 27, 2015, now Pat. No. 9,877,016, which is a (Continued)

(51) Int. Cl.
H04N 13/243 (2018.01)
H04N 13/344 (2018.01)
(Continued)

(52) U.S. Cl.
CPC ......... H04N 13/344 (2018.05); G02B 27/017 (2013.01); G02B 27/0172 (2013.01);
(Continued)

(58) Field of Classification Search
CPC combination set(s) only.
See application file for complete search history.

(56) References Cited

U.S. PATENT DOCUMENTS 5,020,878 A 6/1991 Brokenshire et al.
5,028,997 A 7/1991 Elberbaum
(Continued)

FOREIGN PATENT DOCUMENTS

CN 1925628 A 3/2007
CN 102450010 A 5/2012
(Continued)

OTHER PUBLICATIONS

"3D Camera Parallax Adjustments, The Stereo Window, and Using Attachments for Close-Up Photography", available online at <http://www.cyclopital3d.com/3D_Camera_Convergence_Adjustments.pdf>, retrieved on Apr. 1, 2015, 5 pages.
(Continued)

Primary Examiner — Behrooz M Senfi
(74) Attorney, Agent, or Firm — Brake Hughes Bellermann LLP

(57) ABSTRACT

Systems and methods are described include defining, at a computing device, a set of images based on captured images, projecting, at the computing device, a portion of the set of images from a planar perspective image plane onto a spherical image plane by recasting a plurality of viewing rays associated with the portion of the set of images from a plurality of viewpoints arranged around a curved path to a viewpoint, determining, at the computing device, a periphery boundary corresponding to the viewpoint and generating updated images by removing pixels that are outside of the periphery boundary, and providing, for display, the updated images within the bounds of the periphery boundary.

18 Claims, 24 Drawing Sheets

Related U.S. Application Data continuation of application No. 14/723,151, filed on May 27, 2015, now Pat. No. 10,038,887.

(51) Int. Cl.
```
G02B 27/01      (2006.01)
H04N 13/366     (2018.01)
G06T 15/20      (2011.01)
H04N 13/211     (2018.01)
H04N 13/221     (2018.01)
H04N 13/111     (2018.01)
H04N 13/161     (2018.01)
H04N 13/296     (2018.01)
H04N 13/239     (2018.01)
```

(52) U.S. Cl.
CPC .......... *G06T 15/205* (2013.01); *H04N 13/111* (2018.05); *H04N 13/161* (2018.05); *H04N 13/211* (2018.05); *H04N 13/221* (2018.05); *H04N 13/239* (2018.05); *H04N 13/243* (2018.05); *H04N 13/296* (2018.05); *H04N 13/366* (2018.05); *G02B 2027/011* (2013.01); *G02B 2027/014* (2013.01); *G02B 2027/0134* (2013.01); *G02B 2027/0138* (2013.01); *G02B 2027/0187* (2013.01)

(56) References Cited

U.S. PATENT DOCUMENTS

| | | | |
|---|---|---|---|
| 5,495,576 | A | 2/1996 | Ritchey |
| 5,790,182 | A | 8/1998 | St. Hilaire |
| 6,141,034 | A | 10/2000 | McCutchen |
| 6,333,826 | B1 | 12/2001 | Charles |
| 6,456,731 | B1 | 9/2002 | Chiba et al. |
| 6,545,702 | B1 | 4/2003 | Konolige et al. |
| 6,665,003 | B1 | 12/2003 | Peleg et al. |
| 6,701,030 | B1 | 3/2004 | Uyttendaele et al. |
| 6,788,802 | B2 | 9/2004 | Chiba et al. |
| 6,864,911 | B1 | 3/2005 | Zhang et al. |
| 6,947,059 | B2 | 9/2005 | Pierce et al. |
| 7,583,288 | B2 * | 9/2009 | Uyttendaele ....... H04N 5/23238 348/36 |
| 7,714,936 | B1 | 5/2010 | Martin et al. |
| 7,742,046 | B2 | 6/2010 | Fukushima et al. |
| 8,274,550 | B2 | 9/2012 | Steuart, III |
| 8,441,523 | B2 | 5/2013 | Kokojima et al. |
| 8,548,269 | B2 | 10/2013 | Zargarpour et al. |
| 8,824,779 | B1 | 9/2014 | Smyth |
| 8,896,675 | B2 | 11/2014 | Moliton et al. |
| 9,398,215 | B2 * | 7/2016 | Richardt ............ H04N 5/23238 |
| 9,729,899 | B2 | 8/2017 | Tourapis et al. |
| 9,877,016 | B2 * | 1/2018 | Esteban ............. G02B 27/0172 |
| 2002/0109833 | A1 | 8/2002 | Chiba |
| 2003/0189730 | A1 | 10/2003 | Enomoto |
| 2004/0001138 | A1 | 1/2004 | Weerashinghe et al. |
| 2004/0027451 | A1 | 2/2004 | Baker |
| 2004/0183941 | A1 | 9/2004 | McCutchen |
| 2006/0164509 | A1 | 7/2006 | Marshall et al. |
| 2007/0097206 | A1 | 5/2007 | Houvener et al. |
| 2008/0024594 | A1 | 1/2008 | Ritchey |
| 2008/0106489 | A1 | 5/2008 | Brown et al. |
| 2008/0316301 | A1 | 12/2008 | Givon |
| 2011/0227812 | A1 | 9/2011 | Haddick et al. |
| 2011/0234832 | A1 | 9/2011 | Ezoe et al. |
| 2012/0194636 | A1 | 8/2012 | Tokunaga et al. |
| 2012/0212484 | A1 | 8/2012 | Haddick et al. |
| 2013/0002809 | A1 | 1/2013 | Shimizu |
| 2013/0050833 | A1 | 2/2013 | Lewis et al. |
| 2014/0085423 | A1 | 3/2014 | Lee |
| 2014/0098186 | A1 | 4/2014 | Seidl et al. |
| 2014/0104685 | A1 | 4/2014 | Bohn et al. |
| 2014/0192144 | A1 | 7/2014 | St. Clair |
| 2014/0267586 | A1 | 9/2014 | Aguilar et al. |
| 2015/0210274 | A1 | 7/2015 | Clarke et al. |
| 2015/0248772 | A1 | 9/2015 | Gove et al. |
| 2015/0341617 | A1 | 11/2015 | Cole et al. |
| 2015/0348580 | A1 | 12/2015 | Van Hoff et al. |
| 2016/0097966 | A1 | 4/2016 | Song et al. |
| 2016/0212409 | A1 | 7/2016 | Cole et al. |
| 2016/0116827 | A1 | 8/2016 | Tarres Bolos |
| 2016/0248987 | A1 | 8/2016 | Zilly et al. |
| 2016/0282619 | A1 | 9/2016 | Oto et al. |
| 2016/0307372 | A1 | 10/2016 | Pitts et al. |
| 2016/0353089 | A1 | 12/2016 | Gallup et al. |
| 2016/0353090 | A1 | 12/2016 | Esteban et al. |
| 2016/0366392 | A1 | 12/2016 | Raghoebardajal et al. |
| 2017/0078647 | A1 | 3/2017 | Van Hoff et al. |

FOREIGN PATENT DOCUMENTS

| | | | |
|---|---|---|---|
| CN | 107431796 | A | 12/2017 |
| CN | 107431803 | A | 12/2017 |
| EP | 2793187 | A1 | 10/2014 |
| JP | H02280280 | A | 11/1990 |
| JP | H11220758 | A | 8/1999 |
| JP | 2003524927 | A | 8/2003 |
| JP | 2005167638 | A | 6/2005 |
| JP | 2005277825 | A | 10/2005 |
| JP | 2006350852 | A | 12/2006 |
| JP | 2010182094 | A | 8/2010 |
| JP | 2014212519 | A | 11/2014 |
| JP | 2015095045 | A | 5/2015 |
| KR | 10-2017-0123328 | A | 11/2017 |
| KR | 10-2017-0123667 | A | 11/2017 |
| WO | 1993/010475 | A1 | 5/1993 |
| WO | 2006110584 | A2 | 10/2006 |
| WO | 2014/108799 | A2 | 7/2014 |
| WO | 2014117266 | A1 | 8/2014 |
| WO | 2014152855 | A2 | 9/2014 |
| WO | 2016/191464 | A1 | 12/2016 |
| WO | 2016/191467 | A1 | 12/2016 |

OTHER PUBLICATIONS

Ainsworth et al., "Acquisition of Stereo Panoramas for Display in VR Environments", Three-Dimensional Imaging, Interaction and Measurement, SPIE vol. 7864, 2011, pp. 786416-1-786416-15.

Ardouin et al., "Navigating in Virtual Environments with 360 DEG Omnidirectional Rendering", IEEE Symposium on 3D User Interfaces, IEEE, Mar. 16-17, 2013, pp. 95-98.

Ardouin et al., "Stereoscopic rendering of virtual environments with wide Field-of-Views up to 360 DEG", HAL Archives, 2014 IEEE Virtual Reality, Mar. 2014, 7 pages.

Firoozfam et al., "A Conical Panoramic Stereo Imaging System for 3-D Scene Reconstruction", Proceedings of OCEANS, vol. 4, Sep. 22-26, 2003, pp. 2303-2308.

"Proceedings of 1999 IEEE Computer Society Conference on Vision and Pattern Recognition", IEEE Computer Society Technical Committee on Pattern Analysis and Machine Intelligence, vol. 2, Jun. 23-25, 1999, 17 pages.

Jiang et al., "Panoramic 3D Reconstruction Using Rotational Stereo Camera with Simple Epipolar Constraints", Proceedings of IEEE Computer Society Conference on Computer Vision and Pattern Recognition, 2006, 8 pages.

Peleg et al., "Cameras for Stereo Panoramic Imaging", IEEE Conference on Computer Vision and Pattern Recognition, 2000, 7 pages.

Peleg et al., "Omnistereo: Panoramic Stereo Imaging", IEEE Transactions on Pattern Analysis and Machine Intelligence, vol. 23, No. 3, Mar. 2001, pp. 279-290.

Peleg et al., "Stereo Mosaicing from a Single Moving Video Camera", Proceedings of SPIE vol. 4297, 2001, pp. 98-106.

Pritch et al., "Optics for Omnistereo Imaging", Foundations of Image Understanding, Jan. 2011, 22 pages.

Richardt et al., "Megastereo: Constructing High-Resolution Stereo Panoramas", International Conference on Computer Vision and Pattern Recognition, Jun. 2013, pp. 1-8.

(56) References Cited

OTHER PUBLICATIONS

Shum et al., "Panoramic Image Mosaics", Microsoft Research Technical Report MSR-TR-97-23, available online at <http://citeseerx.ist.psu.edu/viewdoc/download?doi=10.1.1.32.9903&rep=rep1&type=pdf>, pp. 1-50.
Wang et al., "Adaptive Parallax Control for Multi-View Stereo Panoramas", Proceedings of SPIE-IS&T Electronic Imaging, vol. 6055, 2006, pp. 60550Z-1-60550Z-12.
International Search Report and Written Opinion received for PCT Patent Application No. PCT/US2016/034072, dated Aug. 17, 2016, 22 pages.
International Search Report and Written Opinion received for PCT Patent Application No. PCT/US2016/034077, dated Oct. 10, 2016, 22 pages.
International Search Report and Written Opinion from PCT/US2017/047384, dated Oct. 23, 2017, 13 pages.
Partial Search Report for European Application No. 18185660.0, dated Oct. 25, 2018, 16 pages.
Notice of Allowance for Japanese Application No. 2017-550745, dated Mar. 12, 2019, 3 pages.

\* cited by examiner

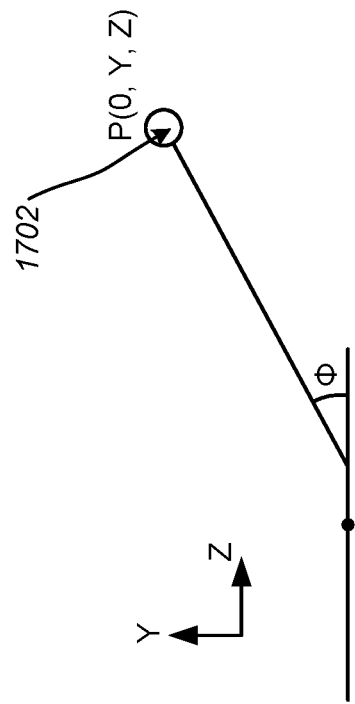
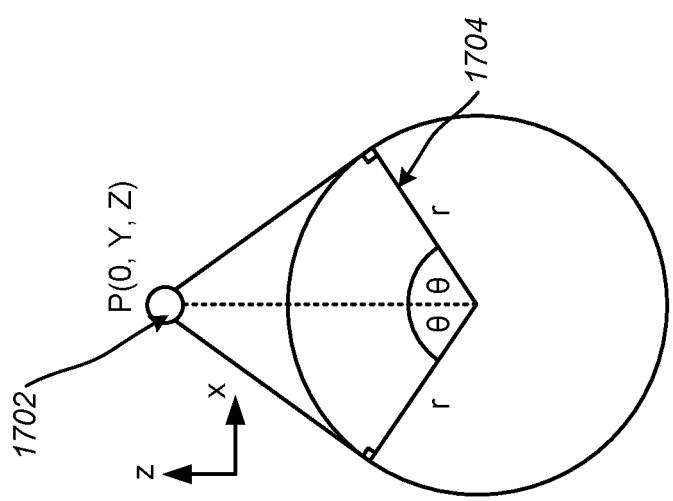
FIG. 17B
FIG. 17A

OMNISTEREO CAPTURE AND RENDER OF PANORAMIC VIRTUAL REALITY CONTENT

CROSS REFERENCE TO RELATED APPLICATIONS

This application is continuation of U.S. Non-provisional patent application Ser. No. 14/723,178, filed May 27, 2015, and is a continuation of U.S. Non-provisional patent application Ser. No. 14/723,151, filed May 27, 2015, the entireties of which are herein incorporated by reference.

TECHNICAL FIELD

This description generally relates to generating panoramas. In particular, the description relates to generating stereoscopic panoramas from captured images for display in virtual reality (VR) environment.

BACKGROUND

Panoramic photography techniques can be used on images and video to provide a wide view of a scene. Conventionally, panoramic photography techniques and imaging techniques can be used to obtain panoramic images from a number of adjoining photographs taken with a conventional camera. The photographs can be mounted together in alignment to obtain a panoramic image.

SUMMARY

In one general aspect, a computer-implemented method includes defining, at a computing device, a set of images based on captured images, projecting, at the computing device, a portion of the set of images from a planar perspective image plane onto a spherical image plane by recasting a plurality of viewing rays associated with the portion of the set of images from a plurality of viewpoints arranged around a curved path to a viewpoint, and determining, at the computing device, a periphery boundary corresponding to the viewpoint and generating updated images by removing pixels that are outside of the periphery boundary. The method may also include providing, for display, the updated images within the bounds of the periphery boundary. Other embodiments of this aspect include corresponding computer systems, apparatus, and computer programs recorded on one or more computer storage devices, each configured to perform the actions of the methods.

In another general aspect, an imaging system is included, the imaging system configured to generate stereo panoramas. The system may include an interpolation module configured to provide interpolated images from a set of defined images and interleave the interpolated images into the set of images to generate additional virtual content for a stereo panorama, a projection module configured to project the set of images from a planar perspective projection to a spherical projection, and a capture correction module configured to adjust the set of images to compensate for a non-circular camera trajectory. The system may also include a stitching module configured to sample portions of images from the set of images and from the interpolated images, blend the portions of images together to generate at least one pixel value, and generate a three-dimensional stereoscopic panorama that includes video content by configuring the pixel value into a left scene and a right scene. The imaging system also includes an image correction module configured to estimate optical flow for the set of images to eliminate distortion. Other embodiments of this aspect include corresponding computer systems, apparatus, and computer programs recorded on one or more computer storage devices, each configured to perform the actions of the methods.

In another general aspect, a computer-implemented method includes defining, at a computing device, a set of images based on captured images, stitching (using the estimated optical flow), at the computing device, the set of images into an equirectanglar video stream, rendering, at the computing device, the video stream for playback by projecting the video stream from planar perspective to equirectangular perspective for a first view and a second view, and determining, at the computing device, a boundary in which distortion is above a predefined threshold, the distortion being based at least in part on projecting the video stream. The method may also include generating, at the computing device, an updated video stream by removing image content in the set of images at and outside of an interior defined by the boundary; and providing the updated video stream for display. Other embodiments of this aspect include corresponding computer systems, apparatus, and computer programs recorded on one or more computer storage devices, each configured to perform the actions of the methods.

The details of one or more implementations are set forth in the accompanying drawings and the description below. Other features will be apparent from the description and drawings, and from the claims.

BRIEF DESCRIPTION OF THE DRAWINGS

FIGS. 17A-B depict example points of a coordinate system that can be used to illustrate points in a 3D panorama.

Like reference symbols in the various drawings indicate like elements.

DETAILED DESCRIPTION

Creating panoramic images generally includes capturing images or video of a surrounding, three-dimensional (3D) scene using a single camera or a number of cameras in a camera rig, for example. When using a camera rig that houses several cameras, each camera can be synchronized and configured to capture images at a particular point in time. For example, the first frame captured by each camera can be captured at approximately the same time as the second, third, and fourth cameras capture corresponding first frames. The image capture can continue in a simultaneous manner until some or all of the scene is captured.

Camera rigs that house multiple cameras may be configured to capture particular angles of the scene. For example, cameras housed on the camera rig may be directed at a specific angle and all (or at least a portion of) content captured from that angle may be processed to generate a full panorama of a particular scene. In some implementations, each of the cameras can be directed at different angles to capture different angles of the scene. In the event that only a portion of the scene is captured or some or all of the scene includes distortion, a number of processes can be performed to interpolate or configure any missing, corrupted, or distorted content from the panorama. The following disclosure describes a number of apparatus and methods to capture, process, correct, and render 3D panoramic content for purposes of displaying such content in a head-mounted display (HMD) device in a 3D virtual reality (VR) environment.

Figure 1:
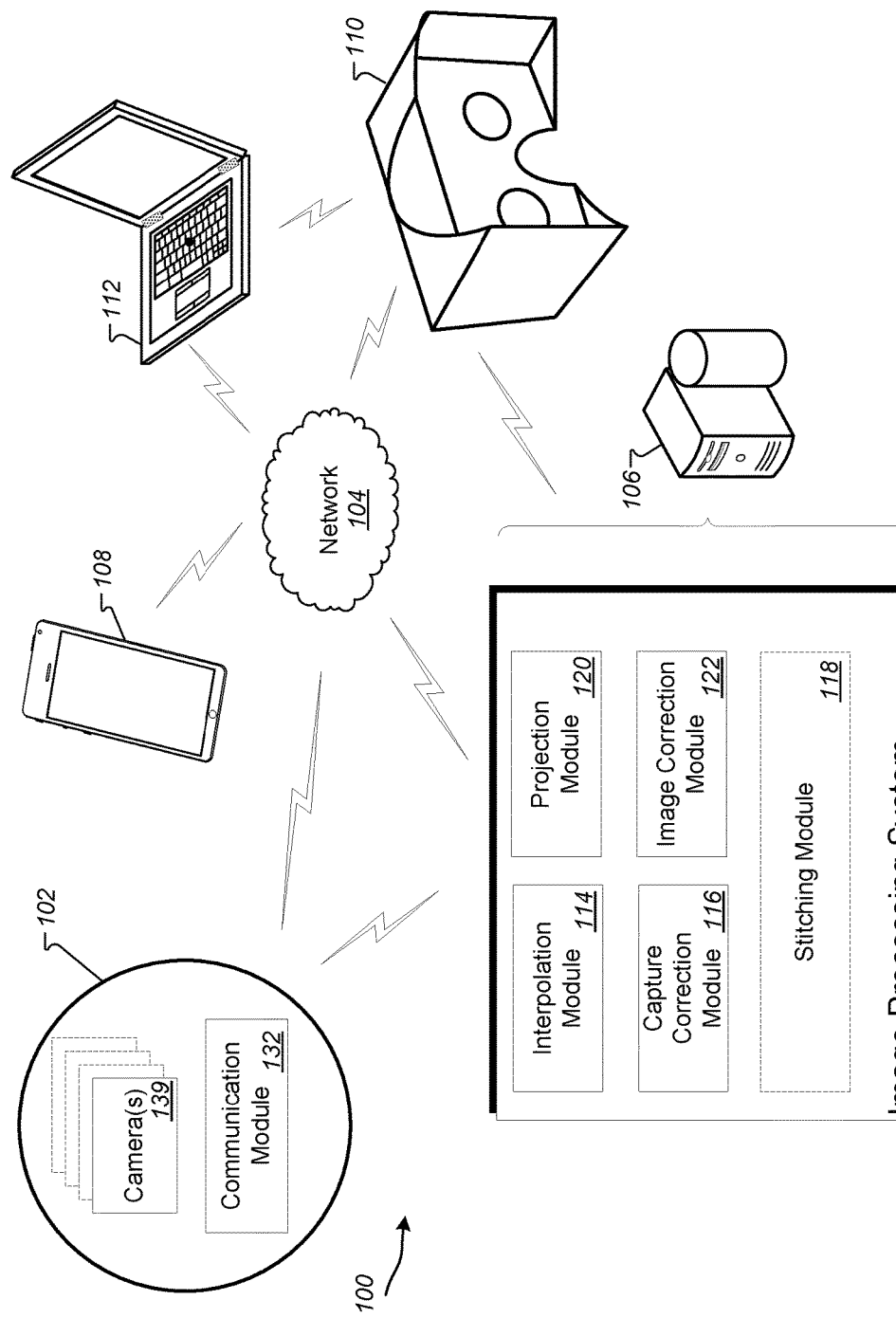
FIG. 1 is a block diagram of an example system for capturing and rendering stereoscopic panoramas in a 3D virtual reality (VR) environment.

FIG. 1 is a block diagram of an example system 100 for capturing and rendering stereoscopic panoramas in a 3D virtual reality (VR) environment. In the example system 100, a camera rig 102 can capture and provide images over a network 104, or alternatively, can provide the images directly to an image processing system 106 for analysis and processing. In some implementations of system 100, a mobile device 108 can function as the camera rig 102 to provide images throughout network 104. Once the images are captured, the image processing system 106 can perform a number of calculations and processes on the images and provide the processed images to a head mounted display (HMD) device 110 for rendering over network 104, for example. In some implementations, the image processing system 106 can also provide the processed images to mobile device 108 and/or to computing device 112 for rendering, storage, or further processing.

The HMD device 110 may represent a virtual reality headset, glasses, eyepiece, or other wearable device capable of displaying virtual reality content. In operation, the HMD device 110 can execute a VR application (not shown) which can playback received and/or processed images to a user. In some implementations, the VR application can be hosted by one or more of the devices 106, 108, or 112, shown in FIG. 1. In one example, the HMD device 110 can provide a video playback of a scene captured by camera rig 102. In another example, the HMD device 110 can provide playback of still images stitched into a single panoramic scene.

The camera rig 102 can be configured for use as a camera (also can be referred to as a capture device) and/or processing device to gather image data for rendering content in a VR environment. Although camera rig 102 is shown as a block diagram described with particular functionality herein, rig 102 can take the form of any of the implementations shown in FIGS. 2-6 and additionally may have functionality described for the camera rigs throughout this disclosure. For example, for simplicity in describing the functionality of system 100, FIG. 1 shows the camera rig 102 without cameras disposed around the rig to capture images. Other implementations of camera rig 102 can include any number of cameras that can be disposed around the circumference of a circular camera rig, such as rig 102.

As shown in FIG. 1, the camera rig 102 includes a number of cameras 130 and a communication system 132. The cameras 130 can include a single still camera or single video camera. In some implementations, the cameras 130 can include multiple still cameras or multiple video cameras disposed (e.g., seated) side-by-side along the outer periphery (e.g., ring) of the rig 102. The cameras 130 may be a video camera, an image sensor, a stereoscopic camera, an infrared camera, and/or a mobile device. The communication system 132 can be used to upload and download images, instructions, and/or other camera related content. The communication may be wired or wireless and can interface over a private or public network.

The camera rig 102 can be configured to function as a stationary rig or a rotational rig. Each camera on the rig is disposed (e.g., placed) offset from a center of rotation for the rig. The camera rig 102 can be configured to rotate around 360 degrees to sweep and capture all or a portion of a 360-degree view of a scene, for example. In some implementations, the rig 102 can be configured to operate in a stationary position and in such a configuration, additional cameras can be added to the rig to capture additional outward angles of views for a scene.

In some implementations, the camera rig 102 includes multiple digital video cameras that are disposed in a side-to-side or back-to-back fashion (e.g., shown in FIG. 3, with respect to camera 302B and 302F) such that their lenses each point in a radially outward direction to view a different portion of the surrounding scene or environment. In some implementations, the multiple digital video cameras are disposed in a tangential configuration with a viewing direction tangent to the circular camera rig 102. For example, the camera rig 102 can include multiple digital video cameras that are disposed such that their lenses each point in a radially outward direction while being arranged tangentially to a base of the rig. The digital video cameras can be pointed to capture content in different directions to view different angled portions of the surrounding scene.

In some implementations, the cameras are disposed in stereo pairs on the camera rig 102. In such a configuration, each first camera in each stereo pair is disposed (e.g., placed) tangentially to a circular path of the camera rig base and aligned (e.g., with the camera lens pointing) in a leftward direction. Each second camera in each stereo pair is disposed (e.g., placed) tangentially to the circular path of the camera rig base and aligned (e.g., with the camera lens) pointing in a rightward direction.

Example settings for the cameras used on the camera rig 102 can include a progressive scan mode at about 60 frames per second (i.e., a mode in which each raster line is sampled to produce each frame of the video, rather than every other line as is the standard recording mode of most video cameras). In addition, each of the cameras can be configured with identical (or similar) settings. Configuring each camera to identical (or similar) settings can provide the advantage of capturing images that can be stitched together in a desirable fashion after capture. Example settings can include setting one or more of the cameras to the same zoom, focus, exposure, and shutter speed, as well as setting the cameras to be white balanced with stabilization features either correlated or turned off.

In some implementations, the camera rig 102 can be calibrated prior to being used to capture one or more images or video. For example, each camera on the camera rig 102 can be calibrated and/or configured to take a panoramic video. The settings may include configuring the rig to operate at a particular rotational speed around a 360-degree sweep, with a wide field of view, and in a clockwise or counterclockwise direction, for example. In some implementations, the cameras on rig 102 can be configured to capture, for example, one frame per degree of a 360-degree sweep of a capture path around a scene. In some implementations, the cameras on rig 102 can be configured to capture, for example, multiple frames per degree of a 360-degree (or less) sweep of a capture path around a scene. In some implementations, the cameras on rig 102 can be configured to capture, for example, multiple frames around a sweep of a capture path around a scene without having to capture particularly measured frames per degree.

In some implementations, the cameras can be configured (e.g., set up) to function synchronously to capture video from the cameras on the camera rig at a specific point in time. In some implementations, the cameras can be configured to function synchronously to capture particular portions of video from one or more of the cameras over a time period. Another example of calibrating the camera rig can include configuring how incoming images are stored. For example, incoming images can be stored as individual frames or video (e.g., .avi files, .mpg files) and such stored images can be uploaded to the Internet, another server or device, or stored locally with each camera on the camera rig 102. In some implementations, incoming images can be stored as encoded video.

The image processing system 106 includes an interpolation module 114, a capture correction module 116, and a stitching module 118. The interpolation module 116 represents algorithms that can be used to sample portions of digital images and video and determine a number of interpolated images that are likely to occur between adjacent images captured from the camera rig 102, for example. In some implementations, the interpolation module 114 can be configured to determine interpolated image-fragments, image-portions, and/or vertical or horizontal image-strips between adjacent images. In some implementations, the interpolation module 114 can be configured to determine flow fields (and/or flow vectors) between related pixels in adjacent images. Flow fields can be used to compensate for both transformations that images have undergone and for processing images that have undergone transformations. For example, flow fields can be used to compensate for a transformation of a particular pixel grid of an obtained image. In some implementations, the interpolation module 114 can generate, by interpolation of surrounding images, one or more images that are not part of the captured images, and can interleave the generated images into the captured images to generate additional virtual reality content for a scene.

The capture correction module 116 can be configured to correct captured images by compensating for a non-ideal capture setup. Example capture setups can include, by way of non-limiting example, a circular camera trajectory, a parallel principal (camera) axis, a viewing-direction that is perpendicular to the camera trajectory, a viewing direction that is tangential to the camera trajectory and/or other capture conditions. In some implementations, the capture correction module 116 can be configured to compensate for one or both of a non-circular camera trajectory during image capture and/or a non-parallel principal axis during image capture.

The capture correction module 116 can be configured to adjust a particular set of images to compensate for content captured using multiple cameras in which camera separation is larger than about 30 degrees. For example, if the distance between cameras is 40 degrees, the capture correction module 116 can account for any missing content in a particular scene based on too little camera coverage by collecting content from additional cameras or by interpolating the missing content.

In some implementations, the capture correction module 116 can also be configured to adjust the set of images to compensate for camera misalignment due to camera pose errors and the like. For example, if camera pose errors (e.g. errors due to orientation and position of camera) occur during image capture, module 116 can blend two or more columns of pixels from several image frames to remove artifacts including artifacts due to poor exposure (or exposure changes from image frame to image frame) and/or due to misalignment of one or more cameras. The stitching module 118 can be configured to generate 3D stereoscopic images based on defined, obtained, and/or interpolated images. The stitching module 118 can be configured to blend/stitch pixels and/or image-strips from multiple image portions. Stitching can be based on flow fields as determined by the interpolation module 114, for example. For example, the stitching module 118 can receive (from interpolation module 114) interpolated image frames that are not part of the set of images and interleave the image frames into the set of images. The interleaving can include the module 118 stitching together the image frames and the set of images based at least in part on the optical flow generated by the interpolation module 114. The stitched combination can be used to generate an omnistereo panorama for display in a VR head mounted display. The image frames may be based on captured video streams collected from a number of stereo pairs of cameras disposed on a particular rig. Such a rig may include about 6 to about 8 stereo pairs of cameras. Other combinations of such a rig can include 12-16 non-paired cameras, for example. In some implementations, the rig may include one or two stereo pairs of cameras. In some implementations, the rig may include as many stereo pairs of cameras that can be seated side-by-side on the rig. In some implementations, the stitching module 118 can use pose information associated, with at least one stereo pair, to pre-stitch a portion of the set of images before performing the interleaving.

In some implementations, using optical flow techniques to stitch images together can include stitching together captured video content. Such optical flow techniques can be used to generate intermediate video content between particular video content that previously captured using the stereo camera pairs and/or singular cameras. This technique can be used as a way to simulate a continuum of cameras on a circular stationary camera rig capturing images. The simulated cameras can capture content similar to a method of sweeping a single camera around in a circle to capture 360 degrees of images, but in the above technique, fewer cameras are actually are placed on the rig and the rig may be stationary. The ability to simulate the continuum of cameras also provides an advantage of being able to capture content per frame in a video (e.g., 360 images at capture spacing of one image per degree).

The generated intermediate video content can be stitched to actual captured video content using optical flow by using a dense set of images (e.g., 360 images at one image per degree), when in actuality, the camera rig captured fewer than 360 images. For example, if the circular camera rig includes 8 stereo pairs of cameras (i.e., 16 cameras) or 16 unpaired cameras, the captured image count may be as low as 16 images. The optical flow techniques can be used to simulate content between the 16 images to provide 360 degrees of video content.

In some implementations, using the optical flow techniques can improve interpolation efficiency. For example, instead of interpolating 360 images, optical flow can be computed between each consecutive pair of cameras (e.g., [1-2], [2-3], [3-4]). Given the captured 16 images and the optical flows, the interpolation module 114 and/or the capture correction module 116 can compute any pixel in any intermediate view without having to interpolate an entire image in one of the 16 images.

The image processing system 106 also includes a projection module 120 and an image correction module 122. The projection module 120 can be configured to generate 3D stereoscopic images by projecting images into a planar perspective plane. For example, the projection module 120 can obtain a projection of particular set of images and can configure a re-projection of a portion of the set of images by converting some of the images from a planar perspective projection into a spherical (i.e., equirectangular) perspective projection. The conversions include projection modeling techniques.

Projection modeling can include defining a center of projection and a projection plane. In the examples described in this disclosure, the center of projection can represent an optical center at an origin (0,0,0) of a predefined xyz-coordinate system. The projection plane can be placed in front of the center of projection with a camera facing to capture images along a z-axis in the xyz-coordinate system. In general, a projection can be computed using the intersection of the planar perspective plane of a particular image ray from a coordinate (x, y, z) to the center of projection. Conversions of the projection can be made by manipulating the coordinate systems using matrix calculations, for example.

Projection modeling for stereoscopic panoramas can include using multi-perspective images that do not have a single center of projection. The multi-perspective is typically shown as a circular shape (e.g., spherical) (see FIG. 13B). When rendering content, the systems described herein can use a sphere as an approximation when converting from one coordinate system to another.

In general, a spherical (i.e., equirectangular) projection provides a plane that is sphere-shaped with the center of the sphere equally surrounding the center of projection. A persective projection provides a view that provides images of 3D objects on a planar (e.g, 2D surface) perspective plane to approximate a user's actual visual perception. In general, images can be rendered on flat image planes (e.g., computer monitor, mobile device LCD screen), so the projection is shown in planar perspective in order to provide an undistorted view. However, planar projection may not allow for 360 degree fields of view, so captured images (e.g., video) can be stored in equirectangular (i.e., spherical) perspective and can be re-projected to planar perspective at render time.

After particular re-projections are completed, the projection module 120 can transmit re-projected portions of images for rendering in an HMD. For example, the projection module 120 can provide portions of a re-projection to a left eye display in HMD 110 and portions of the re-projections to a right eye display in HMD 110. In some implementations, the projection module 120 can be configured to calculate and reduce vertical parallax by performing the above re-projections.

The image correction module 122 can be configured to generate 3D stereoscopic images by compensating for distortion, including, but not limited to, perspective distortion. In some implementations, the image correction module 122 can determine a particular distance in which optical flow is maintained for 3D stereo and can segment the images to show only portions of a scene in which such flow is maintained. For example, the image correction module 122 can determine that the optical flow of 3D stereo images is maintained between about one radial meter from an outward edge of circular camera rig 102, for example, to about five radial meters from the outward edge of the camera rig 102. Accordingly, the image correction module 122 can ensure that the swatch between one meter and five meters is selected for rendering in the HMD 110 in a projection that is free from distortion while also providing proper 3D stereo effects that have proper parallax for a user of the HMD 110.

In some implementations, the image correction module 122 can estimate optical flow by adjusting particular images. The adjustments can include, for example, rectifying a portion of images, determining an estimated camera pose associated with the portion of images, and determining a flow between images in the portion. In a non-limiting example, the image correction module 122 can compensate for a difference in rotation between two particular images in which flow is being computed. This correction can function to remove the flow component caused by a rotation difference (i.e., rotation flow). Such correction results in flow caused by translation (e.g., parallax flow), which can reduce the complexity of flow estimation calculations while making the resulting images accurate and robust. In some implementations, processes in addition to image correction can be performed on the images before rendering. For example, stitching, blending, or additional corrective processes can be performed on the images before rendering is carried out.

In some implementations, the image correction module 122 can correct for projection distortion caused by image content captured with camera geometries that are not based on planar perspective projections. For example, corrections can be applied to the images by interpolating images from a number of different viewing angles and by conditioning viewing rays associated with the images as originating from a common origin. The interpolated images can be interleaved into captured images to produce virtual content that appears accurate to the human eye with a comfortable level of rotational parallax for the human eye.

In the example system 100, the devices 106, 108, and 112 may be a laptop computer, a desktop computer, a mobile computing device, or a gaming console. In some implementations, the devices 106, 108, and 112 can be a mobile computing device that can be disposed (e.g., placed/located) within the HMD device 110. The mobile computing device can include a display device that can be used as the screen for the HMD device 110, for example. Devices 106, 108, and 112 can include hardware and/or software for executing a VR application. In addition, devices 106, 108, and 112 can include hardware and/or software that can recognize, monitor, and track 3D movement of the HMD device 110, when these devices are placed in front of or held within a range of positions relative to the HMD device 110. In some implementations, devices 106, 108, and 112 can provide additional content to HMD device 110 over network 104. In some implementations, devices 102, 106, 108, 110, and 112 can be connected to/interfaced with one or more of each other either paired or connected through network 104. The connection can be wired or wireless. The network 104 can be a public communications network or a private communications network.

The system 100 may include electronic storage. The electronic storage can include non-transitory storage media that electronically stores information. The electronic storage may be configured to store captured images, obtained images, pre-processed images, post-processed images, etc. Images captured with any of the disclosed camera rigs can be processed and stored as one or more streams of video, or stored as individual frames. In some implementations, storage can occur during capture and rendering can occur directly after portions of capture to enable faster access to panoramic stereo content earlier than if capture and processing were concurrent.

Figure 2:
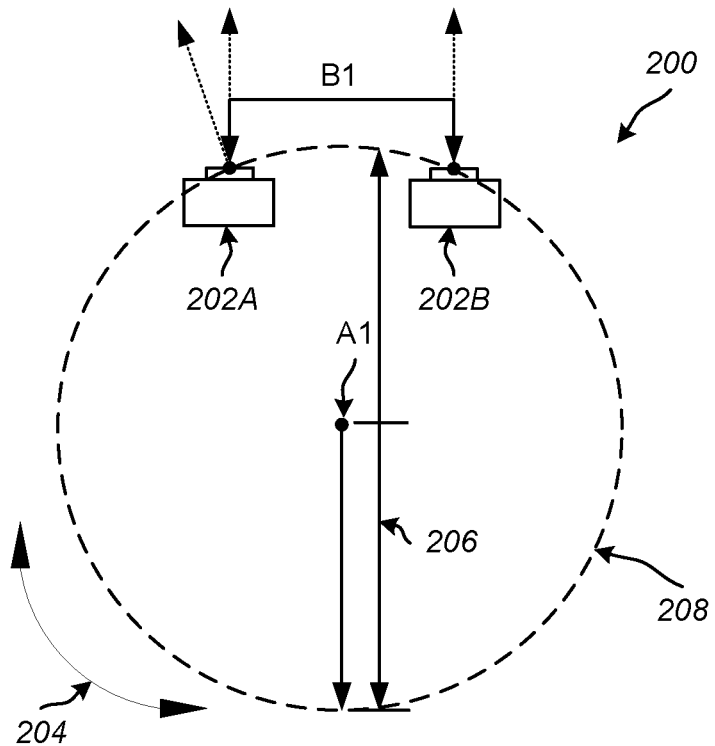
FIG. 2 is a diagram depicting an example camera rig configured to capture images of a scene for use in generating stereoscopic panoramas.

FIG. 2 is a diagram depicting an example camera rig 200 configured to capture images of a scene for use in generating stereoscopic panoramas. The camera rig 200 includes a first camera 202A and a second camera 202B affixed to a ring-shaped support base (not shown). As shown, cameras 202A and 202B are disposed in an annular location facing directly outward (toward images/scenes to be capture) and parallel to a center or axis of rotation (A1) of the rig 200.

In the depicted example, the cameras 202A and 202B are disposed (e.g., placed) on a mount plate 208 at a distance apart (B1). In some implementations, the distance (B1) between each camera on the camera rig 200 may represent an average human interpupillary distance (IPD). Placing the cameras at IPD distance apart can approximate how human eyes would view images as they rotate (left or right as shown by arrow 204) to scan a scene around a capture path indicated by arrow 204. Example average human IPD measurements can be about 5 centimeters to about 6.5 centimeters. In some implementations, each camera disposed at standard IPD distance apart can be part of a stereo pair of cameras.

In some implementations, the camera rig 200 can be configured to approximate a diameter of a standard human head. For example, the camera rig 200 can be designed with a diameter 206 of about 8 centimeters to about 10 centimeters. This diameter 206 can be selected for the rig 200 to approximate how a human head would rotate and view scene images with human eyes with respect to center of rotation A1. Other measurements are possible and the rig 200 or system 100 can adjust the capture techniques and the resulting images if, for example, a larger diameter were to be used.

In a non-limiting example, the camera rig 200 can have a diameter 206 of about 8 centimeters to about 10 centimeters and can house cameras placed at an IPD distance apart of about 6 centimeters. A number of rig arrangements will be described below. Each arrangement described in this disclosure can be configured with the aforementioned or other diameters and distances between cameras.

As shown in FIG. 2, two cameras 202A, 202B can be configured with a wide field of view. For example, the cameras can capture a field of view of about 150 degrees to about 180 degrees. The cameras 202A, 202B may have fish-eye lens to capture wider views. In some implementations, cameras 202A, 202B function as a stereo pair.

In operation, the rig 200 can be rotated 360 degrees around the center of rotation A1 to capture a panoramic scene. Alternatively, the rig can remain stationary and additional cameras can be added to the camera rig 200 to capture additional portions of the 360-degree scene (as shown in FIG. 3).

Figure 3:
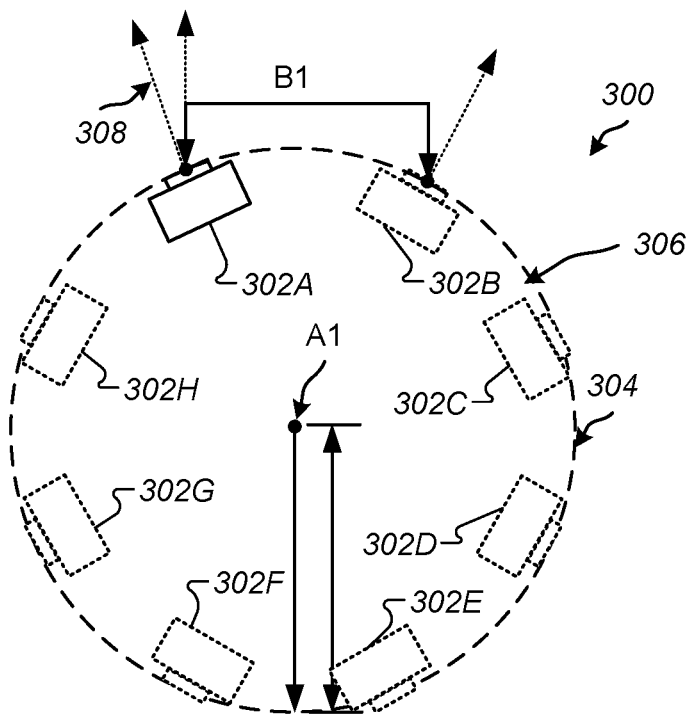
FIG. 3 is a diagram depicting another example camera rig configured to capture images of a scene for use in generating stereoscopic panoramas.

FIG. 3 is a diagram depicting another example camera rig 300 configured to capture images of a scene for use in generating stereoscopic panoramas. The camera rig 300 includes a number of cameras 302A-302H affixed to a ring-shaped support base (not shown). The first camera 302A is shown as a solid line and the additional cameras 302B-302H are shown with broken lines to indicate that they are optional. In contrast to the parallel mounted cameras shown in camera rig 200 (see cameras 202A and 202B), the cameras 302A-302H are disposed tangentially to the outer circumference of the circular camera rig 300.

In the depicted example, the cameras 202A and 202B are disposed at a specific distance apart (B1), similar to the cameras in rig 200. In this example, cameras 302A and 302B can function as a stereo pair to capture angles off of a center camera lens to a leftward and rightward direction, respectively, as described in detail below.

In one example, the camera rig 300 is circular rig that includes a rotatable base (not shown) and a mount plate 306 and the stereo pair of cameras includes a first camera 302A, placed on the mount plate 306, and configured to point in a viewing direction that is tangential to an edge of the mount plate 306 and arranged to point toward a leftward direction, and a second camera 302B, placed on the mount plate 306 in a side-by-side fashion to the first camera and placed at an interpupillary distance from the first camera 302A, the second camera 302B arranged to point in a viewing direction that is tangential to an edge of the mount plate 306 and arranged to point toward a rightward direction. Similarly, stereo pairs can be made from cameras 302C and 302D, another pair from cameras 302E and 302F, and yet another pair from cameras 302G and 302H. In some implementations, each camera (e.g., 302A) can be paired with a camera that is not adjacent to itself, but is adjacent to its neighbor, such that each camera on the rig can be paired to another camera on the rig. In some implementations, each camera can be paired with its direct neighbor.

In some implementations, one or more stereo pairs can be generated by the interpolation module 114. For example, in addition to the stereo pairs shown on camera rig 300, additional stereo pairs can be generated as synthetic stereo image pairs. In particular, analyzing rays from captured images (e.g., ray tracing) can produce simulated frames of a 3D scene. The analysis can include tracing rays backward from a viewpoint through a particular image or image frame and into the scene. If a particular ray strikes an object in the scene, each image pixel through which it passes can be painted with a color to match the object. If the ray does not strike the object, the image pixel can be painted with a color matching a background or other feature in the scene. Using the viewpoints and ray tracing, the interpolation module 114 can generate additional scene content that appears to be from a simulated stereo pair. The additional content can include image effects, missing image content, background content, content for outside the field of view.

As shown in FIG. 3, the cameras 302A-302H are disposed (e.g., placed) tangentially to the outer circumference of camera rig 300, and as such, can capture up to a 180 degree view of a scene. That is, since the cameras are placed in a tangential manner, a fully un-occluded, 180-degree field of view can be captured in each camera on the rig.

In some implementations, the camera rig 300 includes a stereo pair of cameras. For example, the rig 300 can include stereo camera pair 302A and 302B. Camera 302A can be configured with an associated lens directed in a viewing direction that is tangential to an edge of a mount plate 304 and arranged to point toward a leftward direction. Similarly, camera 302B can be disposed on the mount plate 304 in a side-by-side fashion to camera 302A and placed at approximate human interpupillary distance from camera 302A and arranged to point in a viewing direction that is tangential to an edge of the mount plate 304 and arranged to point toward a rightward direction.

In some implementations, particular sensors on cameras 302A-H (or on camera rig 300) may be disposed tangentially to the outer circumference of the cameras 302A-H (or the rig 300), rather than the having the actual cameras 302A-H disposed tangentially. In this manner, the cameras 302A-H can be placed according to a user preference and the sensors can detect which camera or cameras 302A-H can capture images based on rig 300 location, sweeping speed, or based on camera configurations and settings.

In some implementations, the stereo pair can include camera 302A and camera 302E arranged in a back-to-back or side-by-side fashion. This arrangement can also be used to gather viewing angles to the left and right of an azimuth 308 formed by the respective camera lens and the mount plate 304. In some implementations, the cameras are arranged at a tilted angle to the left and right of the azimuth 308 formed by the camera lens and the mount plate 304, respectively.

In some implementations, cameras placed on camera rig 300 can be non-paired and simply aligned around the circular rig in an outward facing direction. In some implementations, the rig 300 includes a single camera (e.g., camera 302A). In the event that only camera 302A is mounted to rig 300, stereo panoramic images can be captured by rotating the camera rig 300 a full 360 degrees clockwise and then repeating the rotation in a counterclockwise motion.

Figure 4:
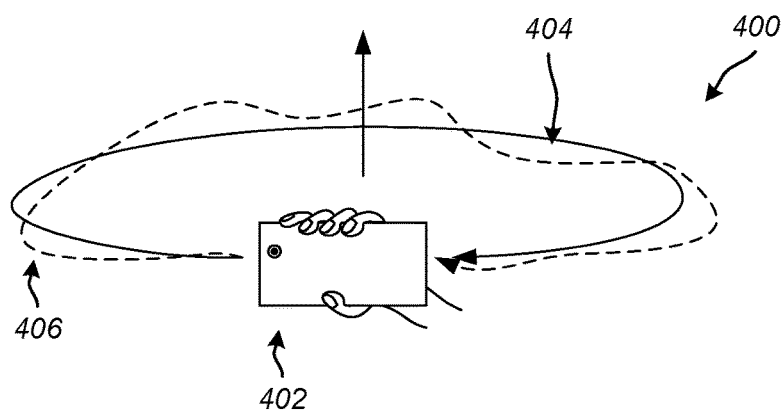
FIG. 4 is a diagram depicting a mobile device configured to capture images of a scene for use in generating stereoscopic panoramas.

FIG. 4 is a diagram depicting a mobile device 402 configured to capture images of a scene for use in generating stereoscopic panoramas. In this example, a user is operating the mobile device 402 and can take video images using the device by recording scenery in a path 404, 406 around their environment. For example, the user can hold the mobile device 402 pointed outward and with the bottom edge of the device 402 parallel to a ground plane and turn clockwise or counterclockwise to sweep the mobile device 402 around the path 404, 406 e to record of video surrounding the user's body. In another example, the user can hold the mobile device 402 overhead and turn to make the device 402 sweep a path 404, 406 or turn the device 402 to make the path 404, 406 to obtain similar imagery. In yet another example, the user can mount the mobile device 402 on a camera rig or tripod and spin the camera around a partial or full 360-degree circular path.

Regardless of how the user captures the 360-degree view, it is possible that the path the user navigates will not follow the path 404, in which a well-constrained arc is made with the device 402 held at about 90 degrees to the user's body. Instead, the mobile device 402, having a user as its guide, may be more likely to traverse the path shown by line 406, in which bumps and movements may occur in both a lateral and vertical direction. Such a movement causes changes in the resulting video or images and may cause issues if any post processing is performed on the video or images. Accordingly, the methods described in this disclosure can correct the imperfectly captured perspective views in the video or image content to provide 3D stereoscopic panoramas.

Figure 5:
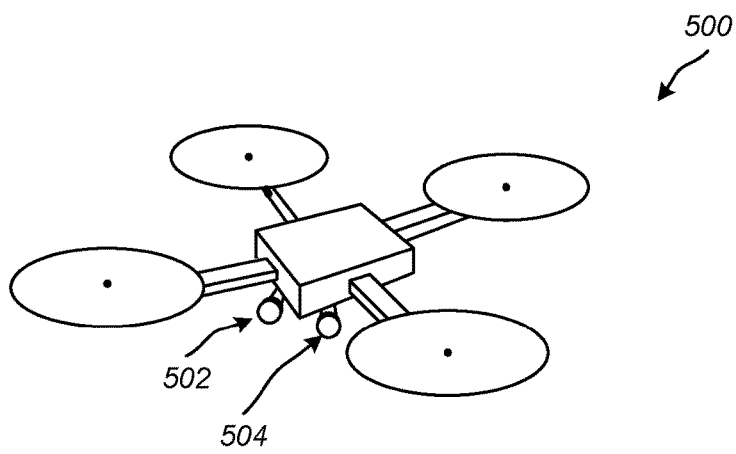
FIG. 5 is a diagram depicting another example camera rig configured to capture images of a scene for use in generating stereoscopic panoramas.

FIG. 5 is a diagram depicting another example camera rig 500 configured to capture images of a scene for use in generating stereoscopic panoramas. Here, the rig 500 is a "quadcoptor," or a quadrotor helicopter. The camera rig 500 is a multirotor helicopter that can be lifted and propelled by four rotors. The camera rig 500 can be configured (e.g., outfitted) with a number of cameras, as described throughout this disclosure. The cameras can be set to capture a panorama of a path around a scene or capture single images around the path of the scene from several cameras mounted around the top or bottom of the rig 500. In general, the path around a scene may refer to a circle around a user or camera rig, a portion of the circle around the user or camera rig, an arc made by a sweeping motion of the mobile device to capture images of a scene, a 360 degree sweep of a scene, a non-constrained path performed by a user walking or turning to capture content surround her, or other path that can be used to capture image content with a mobile device or camera rig.

As shown in FIG. 5, a camera 502 and a camera 504 are disposed on the bottom of the quadcoptor 500. Additional cameras can be added to capture additional images in a panorama, if for example, the quadcoptor 500 were to hover and not rotate. In addition, only one camera can be used to capture a 3D sweeping 360-degree stereo panoramic image. Similar to the cameras mounted on one or more of the above rig configurations, the cameras can be mounted centered, tangential to a particular arc, or angled in another way to capture a portion of a 360 degree circle.

In some implementations, a user can control quadcoptor 500 from a remote control or computer remote. The user can feed instructions to the quadcoptor for what types of images to capture, including, but not limited to video, still frames, sweeping frames, wide view, narrow view, angled view, etc. In some implementations, instructions or directions can be provided to a GPS unit mounted on the quadcoptor to ensure particular scenes are captured. In some implementations, the user can provide a "follow" mode to find a predetermined element in a scene (e.g., an actor, a tree, a path, another quadcoptor or camera rig, etc.). In this example, the user can set the quadcoptor 500 to follow a specific path for a particular amount of time. In some implementations, the user can set the quadcoptor 500 to rotate at a particular speed while traversing the path or upon arriving at a particular destination.

Figure 6:
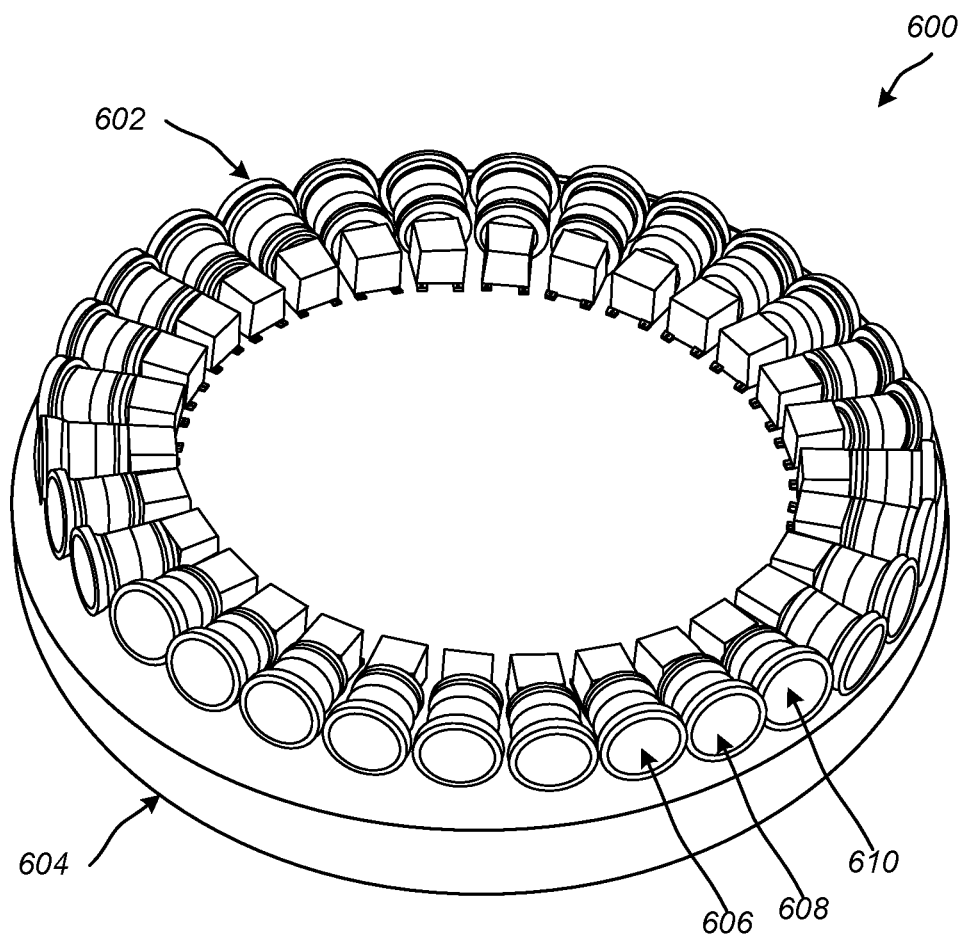
FIG. 6 is a diagram depicting yet another example camera rig configured to capture images of a scene for use in generating stereoscopic panoramas.

FIG. 6 is a diagram depicting another example camera rig 600 configured to capture images of a scene for use in generating stereoscopic panoramas. The camera rig 600 can be mounted on a mount plate 602. The mount plate 602 can be seated on a rotatable base 604. The camera rig 600 includes a number of side-by side cameras (e.g., cameras 606-610) that fill the circumference area of a mount plate 602 of the camera rig. The cameras can be placed to fill the circumference of the rig 600 or alternatively, can be strategically spaced to maximize viewing angles and minimize capturing portions of the rig itself.

In a non-limiting example, the circular camera rig 600 can capture a set of images, using any number of cameras disposed on the mount plate 602, by rotating in an arcing motion parallel to the rotatable base 604. In some implementations, the camera rig 600 includes at a stereo pair of cameras disposed on the mount plate 602. The stereo pair may be synchronized configured, and positioned to capture a field of view associated of about 160 degrees to about 180 degrees. Other fields of view are possible. In some implementations, the camera rig 600 is not mounted on a rotatable base and functions in a stationary manner.

In one example of rig operation, the camera rig (e.g., rig 200, 300, 400, 500, or 600) can be rotated in a first direction during capture of a scene surround the particular rig and subsequently rotated in a different direction during capture of the scene. For example, the camera rig 600 can be rotated clockwise while one or more of the cameras (or stereo pairs) on the rig 600 are placed with a viewing direction that is offset at opposite sides of a center of the base 604 of the camera rig 600. In a similar fashion, the camera rig 600 can then be rotated in a counter-clockwise direction with any number of the cameras facing leftward or rightward to capture additional views of the scene. In one example orientation of rig 600, every other camera can be oriented in one direction (e.g., camera lens angled leftward or rightward) while the cameras in between are oriented in an opposite (e.g., leftward facing or rightward facing) direction.

In some implementations, the base 604 can be fixed. For example, each camera on rig 600 may be any still camera or a video camera that functions in a still mode. Accordingly, the cameras can be synchronized and/or configured to simultaneously capture image frames of a surrounding scene. The aspects can be stitched together to form a stereo panoramic view.

In some implementations, the camera rigs described in this disclosure can include any number of cameras mounted on a circular housing. In some implementations, cameras can be mounted equidistant with a pair of cameras on each of four directions outward from the center of the circular rig. In this example, the cameras, configured as stereoscopic pairs, for example, can be aimed outward along a circumference and disposed in a zero degree, ninety degree, one-hundred eighty degree, and two hundred seventy degree fashion so that each stereoscopic pair captures a separate quadrant of a 360-degree field of view. In general, the selectable field of view of the cameras determines the amount of overlap of camera view of a stereoscopic pair, as well as the size of any blind spots between cameras and between adjacent quadrants. One example camera rig can employ one or more stereoscopic camera pairs configured to capture a field of about 120 degrees up to about 180 degrees.

In some implementations, the camera rigs described in this disclosure can be configured with a diameter (e.g., diameter 206 in FIG. 2) of about 5 centimeters to about 8 centimeters to mimic human interpupillary distances to capture what a user would see if, for example, the user were to turn her head or body in a quarter circle, half circle, full circle, or other portion of a circle. In some implementations, the diameter can refer to a distance across the rig from camera lens to camera lens. In some implementations, the diameter can refer to a distance from one camera sensor across the rig to another camera sensor. In some implementations, the diameter may simply refer to the size of the mount plate (e.g., mount plate 208) from edge to edge across the ring-shaped plate.

In some implementations, the camera rig is scaled up from about 8 centimeters to about 25 centimeters to, for example, house additional camera fixtures. In some implementations, fewer cameras can be used on a smaller diameter rig. In such an example, the systems described in this disclosure can ascertain or deduce views between the cameras on the rig and interleave such views with the actual captured views.

In some implementations, the camera rigs described in this disclosure can be used to capture a panoramic image by capturing an entire panorama in a single exposure by using a camera with a rotating lens, or a rotating camera, for example. The cameras and camera rigs described above can be used with the methods described in this disclosure. In particular, a method described with respect to one camera rig can be performed using any of the other camera rigs described herein. In some implementations, the camera rigs and subsequent captured content can be combined with other content, such as virtual content, rendered computer graphics (CG) content, and/or other obtained or generated images.

Figure 7:
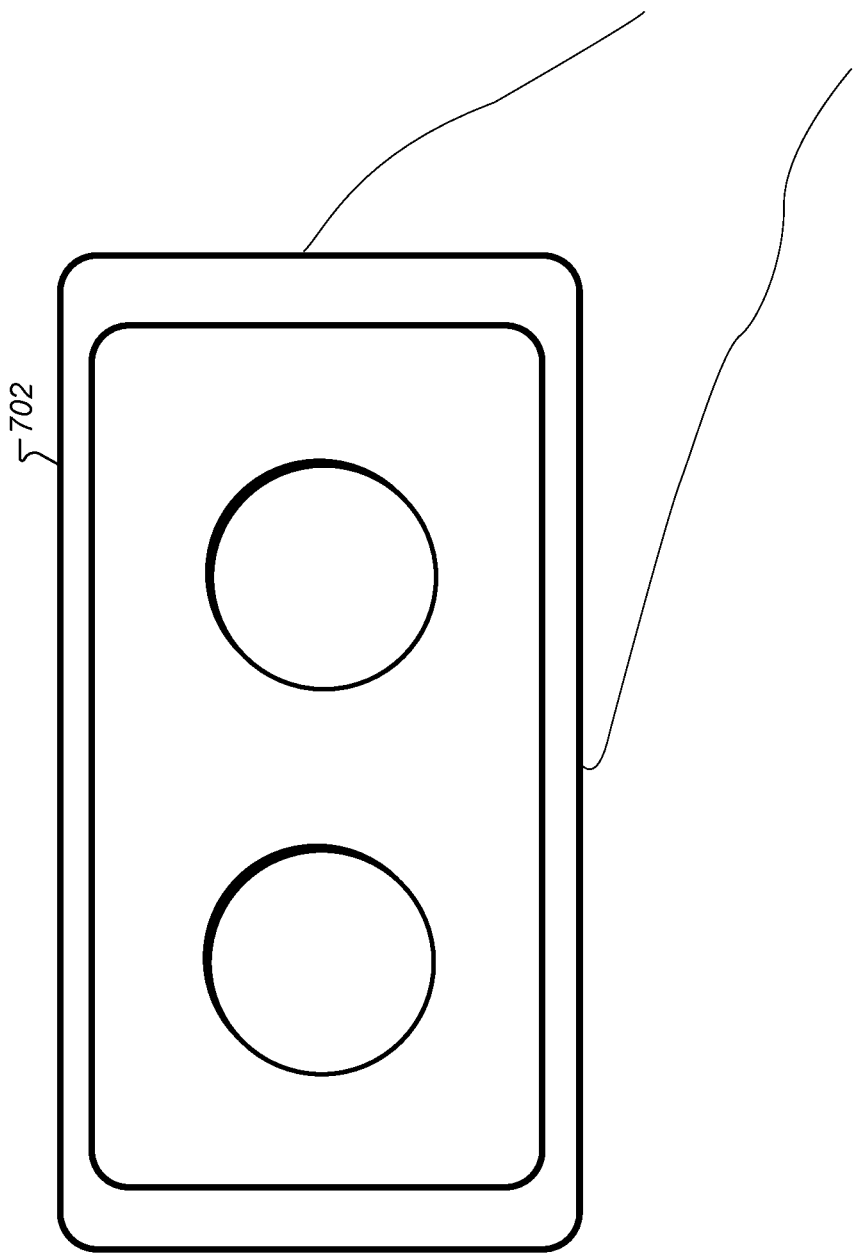
FIG. 7 is a diagram that illustrates an example VR device.

FIG. 7 is a diagram that illustrates an example VR device (VR headset) 702. A user can put on the VR headset 702 by placing the headset 702 over her eyes similar to placing goggles, sunglasses, etc. In some implementations, referring to FIG. 1, the VR headset 702 can interface with/connect to a number of monitors of computing devices 106, 108, or 112, using one or more high-speed wired and/or wireless communications protocols (e.g., Wi-Fi, Bluetooth, Bluetooth LE, USB, etc.) or by using an HDMI interface. The connection can provide the virtual content to the VR headset 702 for display to the user on a screen (not shown) included in the VR headset 702. In some implementations, the VR headset 702 can be a cast-enabled device. In these implementations, the user may choose to provide or "cast" (project) the content to the VR headset 702.

In addition, the VR headset 702 can interface with/connect to the computing device 104 using one or more high-speed wired and/or wireless communications interfaces and protocols (e.g., Wi-Fi, Bluetooth, Bluetooth LE, Universal Serial Bus (USB), etc.). A computing device (FIG. 1) can recognize the interface to the VR headset 702 and, in response, can execute a VR application that renders the user and the computing device in a computer-generated, 3D environment (a VR space) that includes virtual content.

In some implementations, the VR headset 702 can include a removable computing device that can execute a VR application. The removable computing device can be similar to computing devices 108 or 112. The removable computing device can be incorporated within a casing or frame of a VR headset (e.g., the VR headset 702) that can then be put on by a user of the VR headset 702. In these implementations, the removable computing device can provide a display or screen that the user views when interacting with the computer-generated, 3D environment (a VR space). As described above, the mobile computing device 104 can connect to the VR headset 702 using a wired or wireless interface protocol. The mobile computing device 104 can be a controller in the VR space, can appear as an object in the VR space, can provide input to the VR space, and can receive feedback/output from the VR space.

In some implementations, the mobile computing device 108 can execute a VR application and can provide data to the VR headset 702 for the creation of the VR space. In some implementations, the content for the VR space that is displayed to the user on a screen included in the VR headset 702 may also be displayed on a display device included in the mobile computing device 108. This allows someone else to see what the user may be interacting with in the VR space.

The VR headset 702 can provide information and data indicative of a position and orientation of the mobile computing device 108. The VR application can receive and use the position and orientation data as indicative of user interactions within the VR space.

Figure 8:
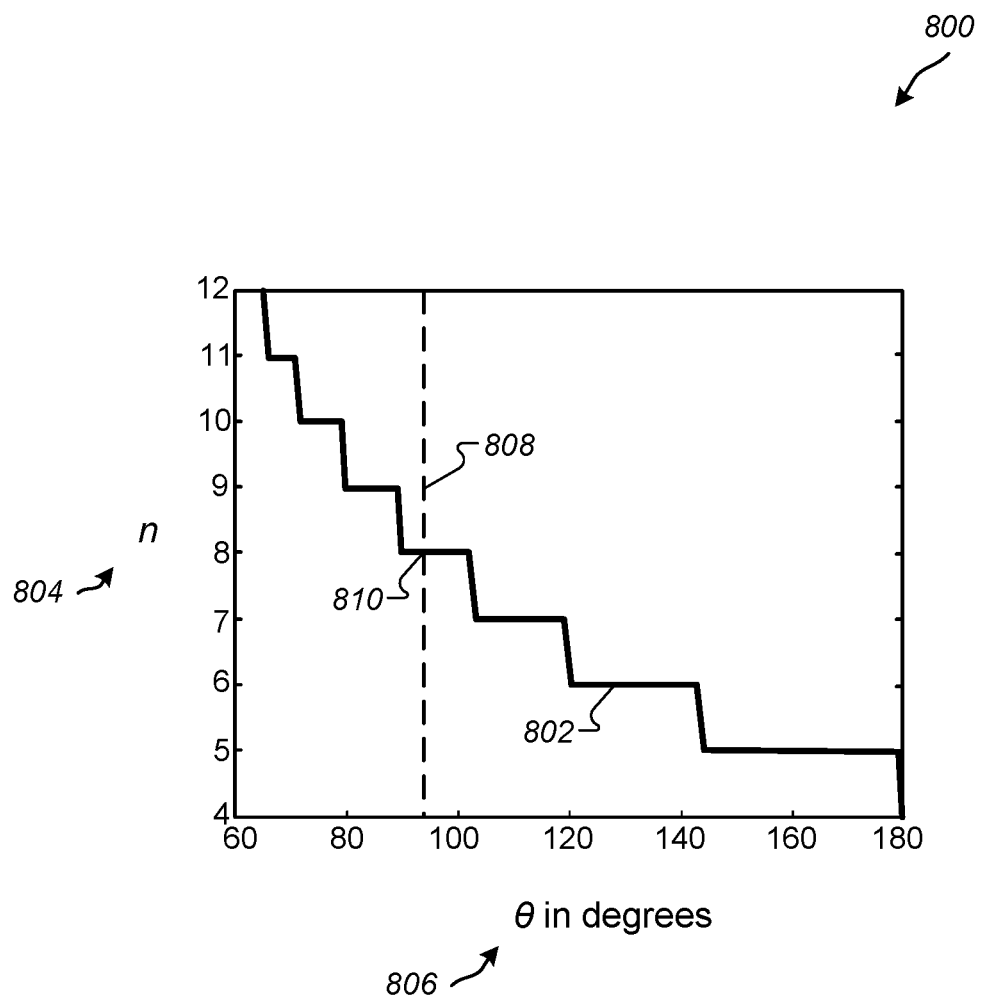
FIG. 8 is an example graph that illustrates a number of camera pairs as a function of a camera field of view.

FIG. 8 is an example graph 800 that illustrates a number of camera pairs as a function of a camera field of view. The graph 800 represents an example graph that can be used to determine the number of camera pairs that may be disposed on a camera rig for a predefined field of view for generating a stereoscopic panorama. The graph 800 can be used to calculate camera settings and camera placement to ensure a particular stereo panoramic outcome. One example setting can include the selection of a number of cameras to affix to a particular camera rig. Another setting can include determining algorithms that will be used during capture, pre- or post-processing steps. For example, for optical flow interpolation techniques, stitching a full 360-degree panorama may dictate that every optic ray direction should be seen by at least two cameras. This may constrain the minimum number of cameras to be used in order to cover the full 360 degrees as a function of the camera field of view, theta [$\theta$]. Optical flow interpolation techniques can be performed and configured either by stereo camera pairs or by individual cameras.

As shown in FIG. 8, a graph is depicted that illustrates a function 802. The function 802 represents a number of camera pairs [n] 804 as a function of the camera field of view [$\theta$] 806. In this example, a camera field of view of about 95 degrees is shown by line 808. The intersection 810 of line 808 and function 802 shows that using eight camera pairs each with a field of view of 95 degrees would provide a desirable panoramic outcome. In such an example, the camera rig can be configured by interleaving left and right cameras for each camera pair to use any space that might occur when placing camera pairs on a rig.

In addition to interleaving the left and right cameras for each pair, the optical flow requirement can dictate that the system 100 compute optical flow between cameras of the same type. That is, optical flow can be computed for the left cameras and then for the right cameras, rather than computing both simultaneously. In general, the flow at a pixel can be calculated as an orientation (e.g., direction and angle) and a magnitude (e.g., speed).

Figure 9:
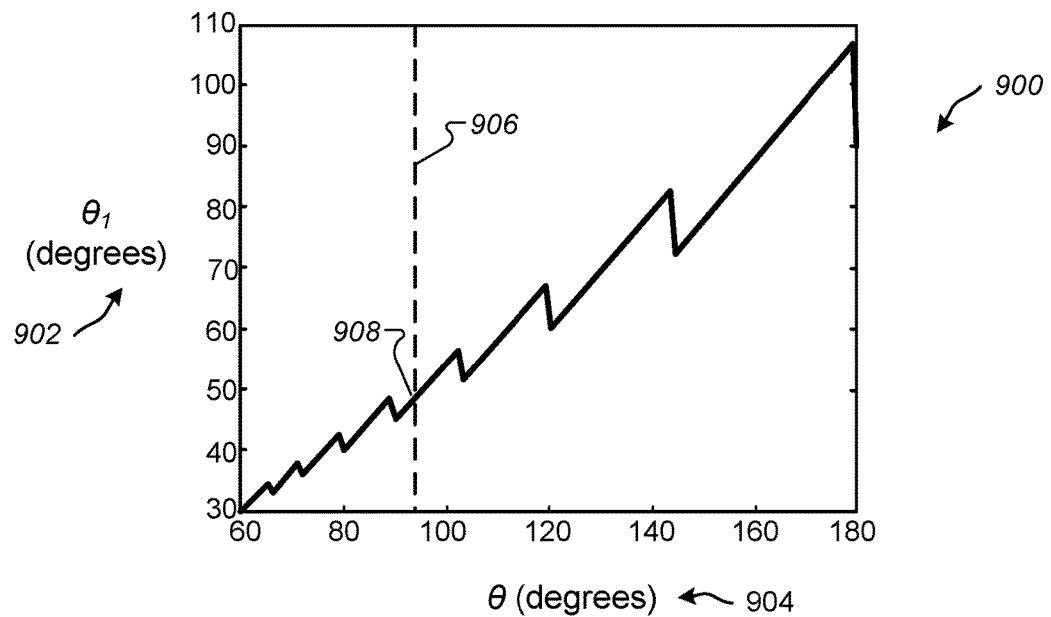
FIG. 9 is an example graph that illustrates an interpolated field of view as a function of a camera field of view.

FIG. 9 is an example graph 900 that illustrates an interpolated field of view [$\theta_1$] 902 as a function of a camera field of view [$\theta$] 904. The graph 900 can be used to determine what portion of the field of view of a camera is shared with its left or right neighbor. Here, at a camera field of view of about 95 degrees (shown by line 906), the interpolated field of view is shown as approximately 48 degrees, as shown by the intersection 908.

Given that two consecutive cameras do not typically capture images of exactly the same field of view, the field of view of an interpolated camera will be represented by the intersection of the field of views of the camera pair. The interpolated field of view [$\theta_1$] can then be a function of the camera field of view [$\theta$] and the angle between camera pairs. If the minimum number of camera pairs is selected for a given camera field of view (using the method shown in FIG. 8), then [$\theta_1$] can be computed as a function of [$\theta$], as shown in FIG. 9.

Figure 10:
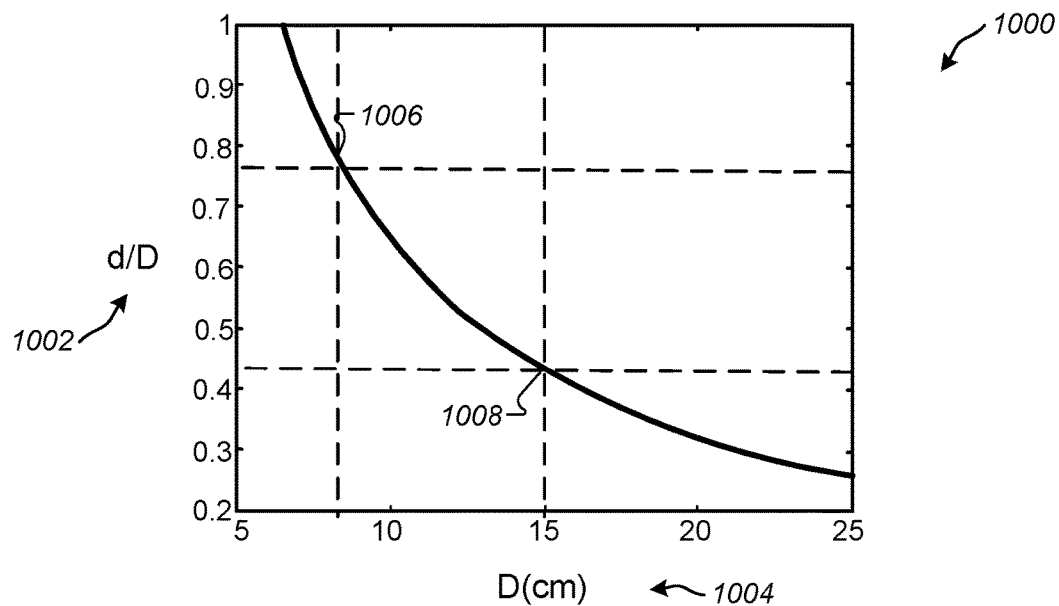
FIG. 10 is an example graph that illustrates selection of a configuration for a camera rig.

FIG. 10 is an example graph 1000 that illustrates selection of a configuration for a camera rig. In particular, graph 1000 can be used to determine how large a particular camera rig can be designed. Graph 1000 depicts a plot of a stitching ratio [d/D] 1002 as a function of rig diameter [D in centimeters] 1004. To produce a comfortable virtual reality panoramic viewing experience, an omnistereo stitching diameter [d] is selected, in the examples in this disclosure, to be about 5 centimeters to about 6.5 centimeters, which is typical of human IPD. In some implementations, omnistereo stitching can be performed using a capture diameter [D] that is about the same as the stitching diameter [d]. That is, maintaining a stitching ratio of about "1" can provide for easier stitching in post-processing of omnistereo images, for example. This particular configuration can minimize distortion since the optic rays used for stitching are the same as the actual camera-captured rays. Obtaining a stitching ratio of "1" can be difficult when the selected number of cameras is high (e.g., 12-18 cameras per rig).

To mitigate the issue of too many cameras on the rig, the rig size can be designed with a larger size to accommodate the additional cameras and allow the stitching ratio to remain the same (or substantially the same). To ensure that the stitching algorithm samples content in images taken near to the center of the lens during capture, the stitching ratio can be fixed to determine an angle [$\alpha$] of the cameras with respect to the rig. For example, FIG. 10 shows that sampling near the center of the lens improves image quality and minimizes geometric distortions. In particular, smaller angles [a] can help avoid rig occlusions (e.g., cameras imaging parts of the rig itself).

As shown in FIG. 10 at 1006, a stitching ratio [d/D] of 0.75 centimeters corresponds to a rig diameter of about 6.5 centimeters (i.e., typical human IPD). Decreasing the stitching ratio [d/D] to about 0.45 allows an increase in the rig diameter to about 15 centimeters (shown at 1008), which can allow additional cameras to be added to the rig. The angle of the cameras with respect to the camera rig can be adjusted based on the selected stitching ratio. For example, adjusting the camera angles to about 30 degrees indicates that the rig diameter can be as large as about 12.5 centimeters. Similarly, adjusting the camera angles to about 25 degrees indicates that the rig diameter can be as large as 15 centimeters and still maintain proper parallax and vision effects when rendered back for a user, for example.

In general, given a rig diameter [D], an optimal camera angle [$\alpha$] can be calculated. From [a], a maximum field of view, [$\Theta_u$], can be calculated. The maximum field of view, [$\Theta_u$], generally corresponds to the field of view where the rig does not partially occlude the cameras. The maximum field of view can limit how few cameras the camera rig can hold and still provide views that are not occluded.

Figure 11:
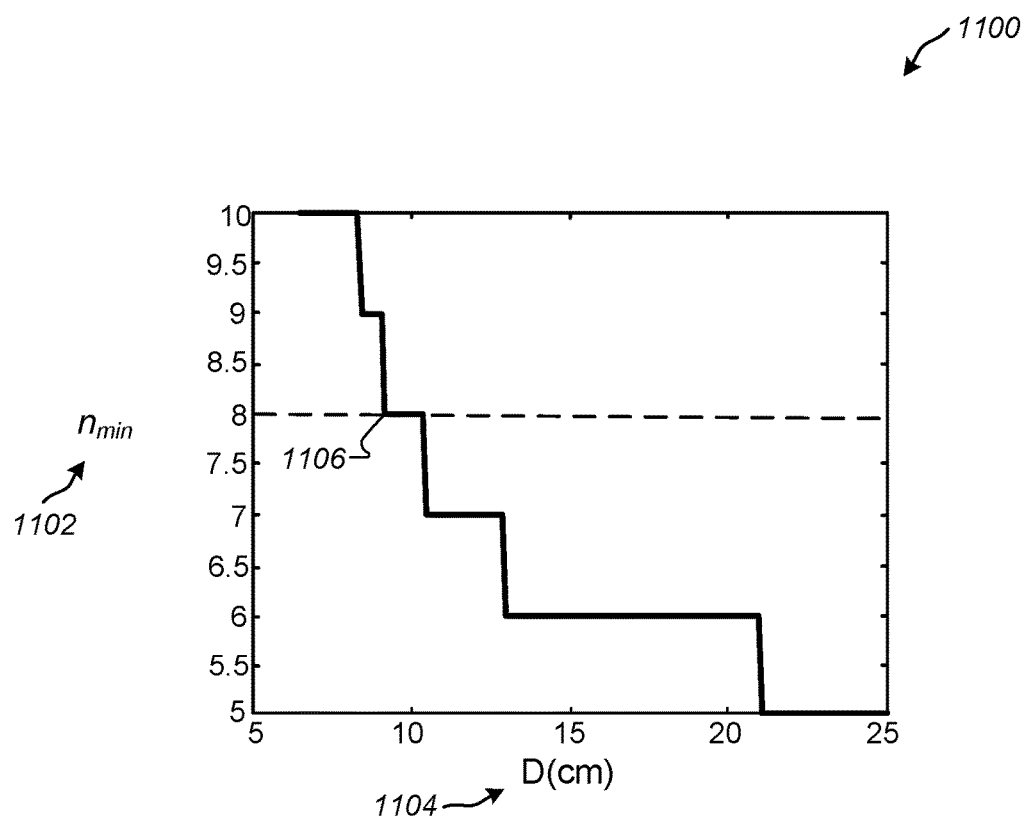
FIG. 11 is a graph that illustrates an example relationship that can be used to determine a minimum number of camera pairs according to a predefined rig diameter.

FIG. 11 is a graph 1100 that illustrates an example relationship that can be used to determine a minimum number of camera pairs according to a predefined rig diameter. Here, the minimum number of camera pairs [$n_{min}$] 1102 for a given rig diameter [D] 1104 is shown. The rig diameter [D] 1104 limits the maximum un-occluded field of view, which functions to limit the minimum number of camera pairs. As shown in the graph at 1106, for a rig diameter of about 10 centimeters, a minimum of eight camera pairs can be used in the camera rig to provide an un-occluded view. Modifying the rig diameter can allow an increase or decrease in the number of cameras placed on the rig. In one example, the rig can accommodate about 6 to about 8 stereo pairs of cameras on a rig size of about 8 to about 25 centimeters.

Since other methods are available to tune the field of view and image capture settings, these calculations can be combined with these other methods to further refine the camera rig dimensions. For example, optical flow algorithms can be used to change (e.g., reduce) the number of cameras typically used to stitch an omnistereo panorama. In some implementations, the graphs depicted in this disclosure or generated from systems and methods described in this disclosure can be used in combination to generate virtual content for rendering in an HMD device, for example.

Figure 12A:
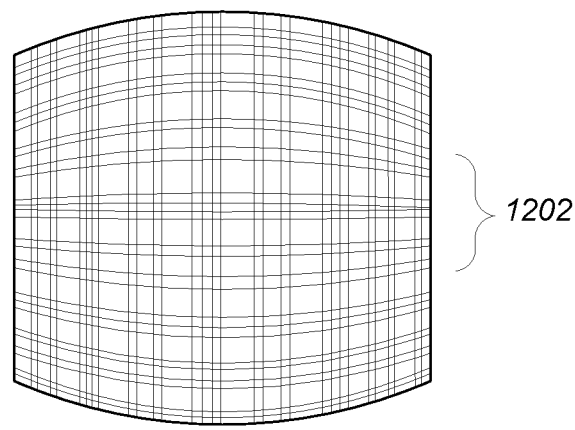
FIGS. 12A-B are line drawing examples of distortion that can occur during image capture.
Figure 12B:
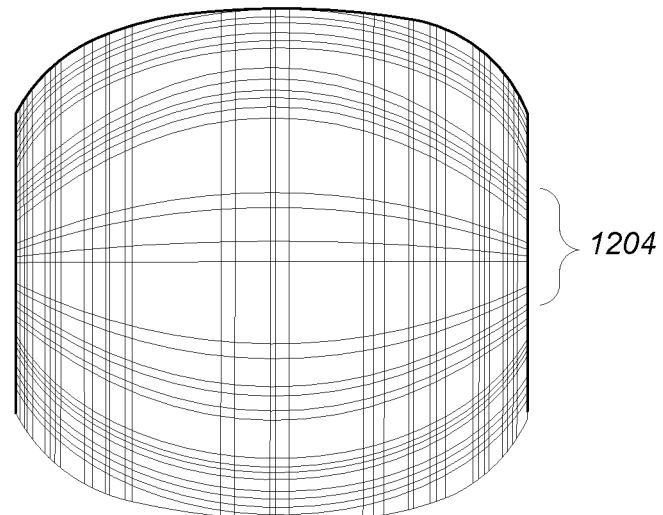

FIGS. 12A-B represent line drawing examples of distortion that can occur during image capture. In particular, the distortion shown here corresponds to effects that occur when capturing stereo panoramas. In general, the distortion can be more severe when the scene is captured close to a camera capturing the scene. FIG. 12A represents a plane in a scene that is two meters by two meters and disposed one meter outward from a camera center. FIG. 12B is the same plane as FIG. 12A, but the plane in this figure is disposed 25 centimeters outward from the camera. Both figures use a 6.5 centimeter capture diameter. FIG. 12A shows a slight stretch near the center at 1202 while FIG. 12B shows a more distended center 1204. A number of techniques can be employed to correct this distortion. The following paragraphs describe using approximation methods and systems (e.g., camera rig/capture devices) that captured image content to analyze projections (e.g., spherical and planar projections) to correct distortion.

Figure 13A:
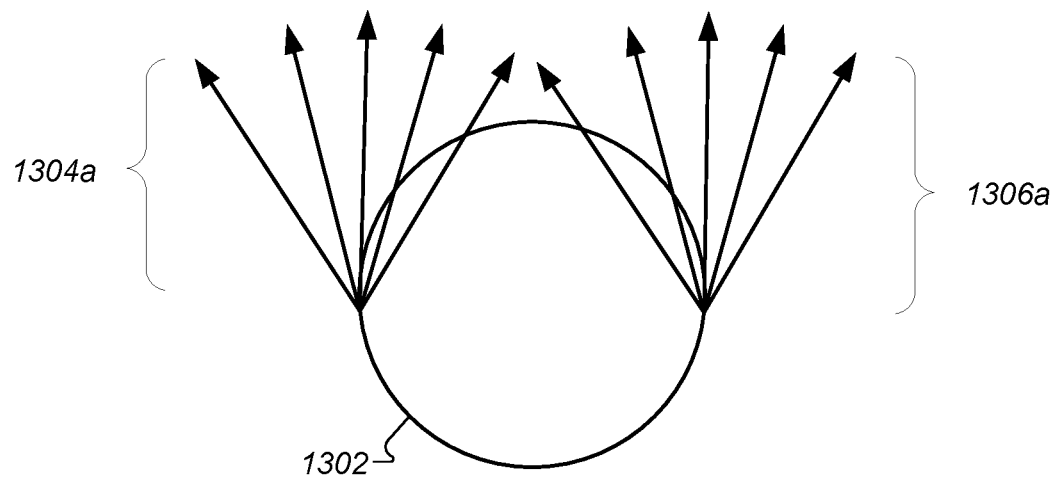
FIGS. 13A-B depict examples of rays captured during collection of a panoramic image.
Figure 13B:
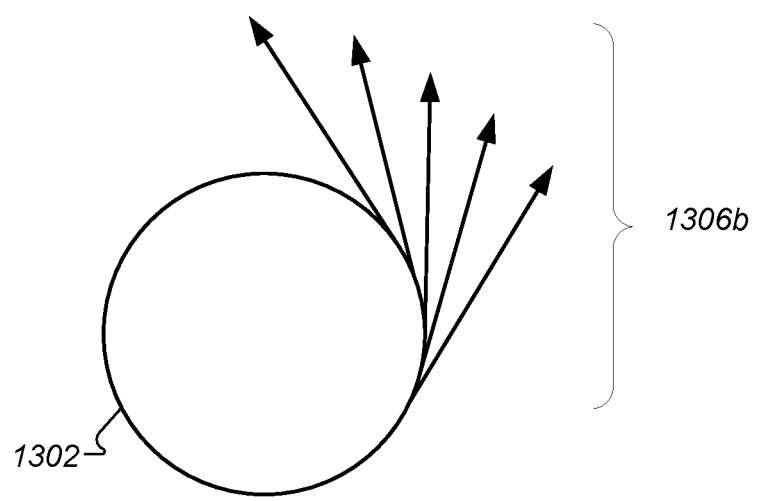

FIGS. 13A-B depict examples of rays captured during collection of a panoramic image. FIG. 13A shows that given a captured set of images, perspective images can be generated for both the left and right eyes anywhere on a capture path 1302. Here, the rays for the left eye are shown by rays 1304a and rays for the right eye are shown at 1306a. In some implementations, each of the depicted rays may not be captured due to camera setup, malfunction, or simply insufficient rig setup for the scene. Because of this, some of the rays 1304a and 1306a can be approximated. For example, if the scene is infinitely far away, then one measurable feature of the scene includes ray direction from an origin to a destination.

In some implementations, the ray origin may not be collectible. As such, the systems in this disclosure can approximate the left and/or right eye to determine an origin location for the ray. FIG. 13B shows approximated ray directions for the right eye 1306b. In this example, instead of the rays originating from the same point, each ray originates from a different point on the circle 1302. The rays 1306b are shown angled tangentially to the capture circle 1302 and are disposed at particular areas around the circumference of the capture circle 1302. A number of rays can be approximated in this manner using a different direction outward from the circle. In this fashion, an entire 360-degree panoramic view can be provided for both the left and right eye views. This technique can result in resolving distortion in mid-range objects, but can still cause deformation when imaging nearby objects. For simplicity, approximated left eye ray directions are not depicted.

Figure 14A:
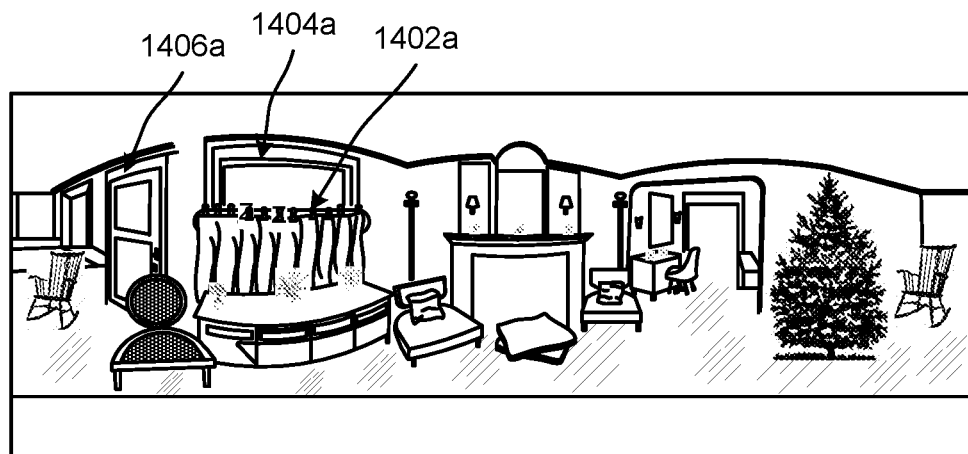
FIGS. 14A-B illustrates the use of approximating planar perspective projection, as described in FIGS. 13A-B.
Figure 14B:
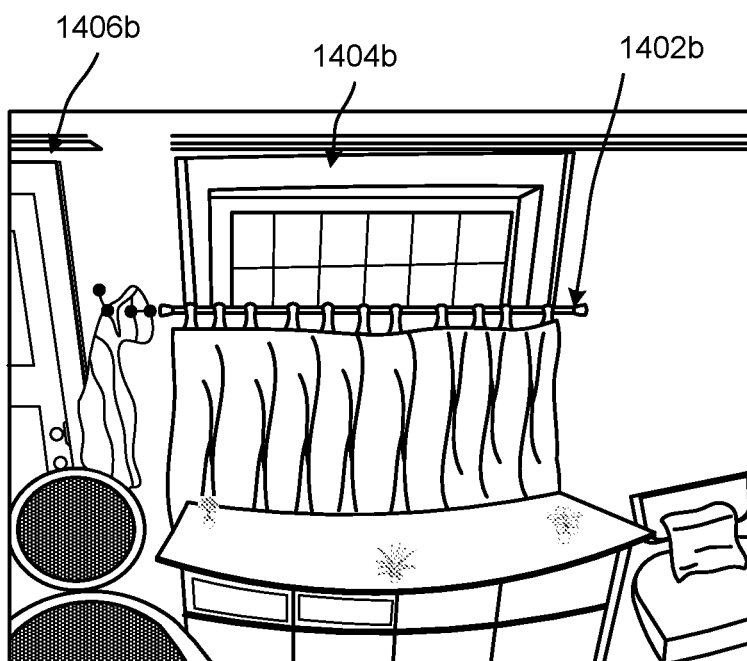

FIGS. 14A-B illustrates the use of approximating planar perspective projection, as described in FIGS. 13A-B. FIG. 14A shows a panoramic scene with distorted lines before approximating the planar perspective rays and projection. As shown, a curtain rod 1402a, a window frame 1404a, and a door 1406a are depicted as objects with curved features, but in actuality, they are straight-featured objects. Straight-featured objects include objects that do not have curved surfaces (e.g., a flat index card, a square box, a rectangular window frame, etc.). In this example, the objects 1402a, 1404a, and 1406a are shown curved because they have been distorted in the image. FIG. 14B shows a corrected image in which the planar perspective projection was approximated at a 90-degree horizontal field of view. Here, the curtain rod 1402a, the window frame 1404a, and the door 1406a are shown as corrected, straight objects 1402a, 1404b, and 1404c, respectively.

Figure 15A:
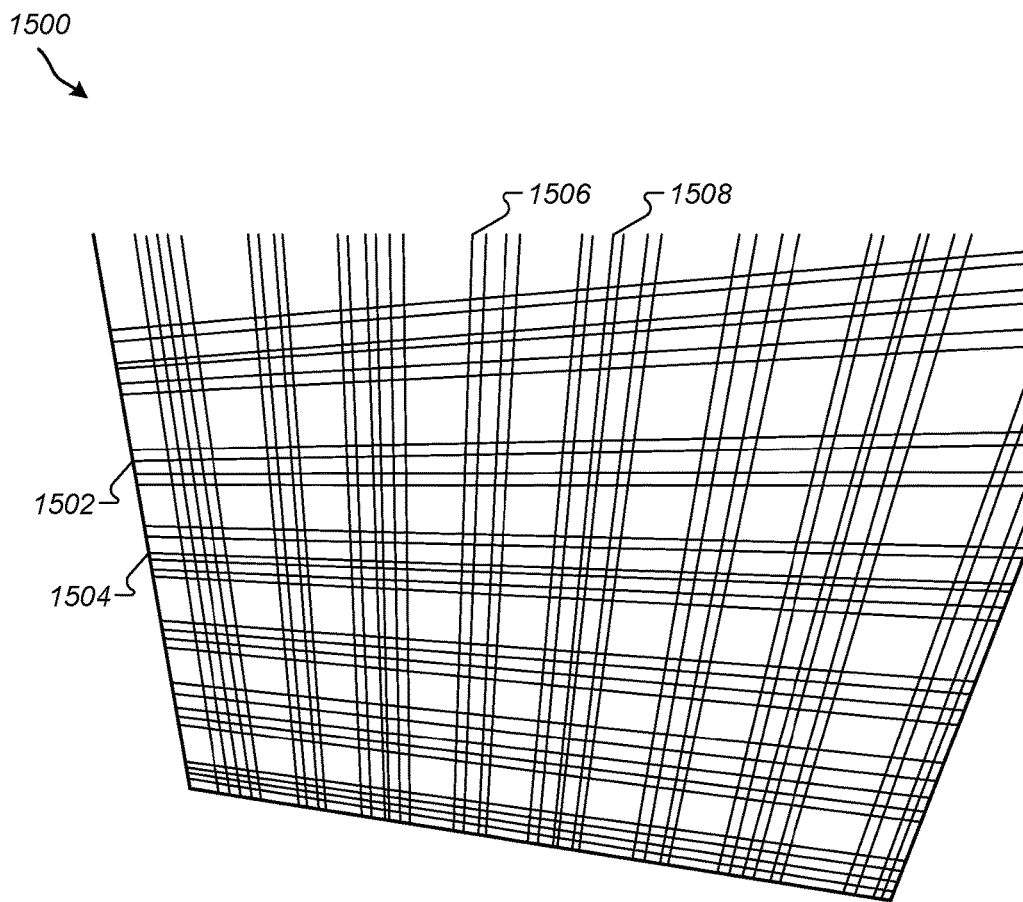
FIGS. 15A-C illustrate examples of approximated planar perspective projection applied to planes of an image.
Figure 15B:
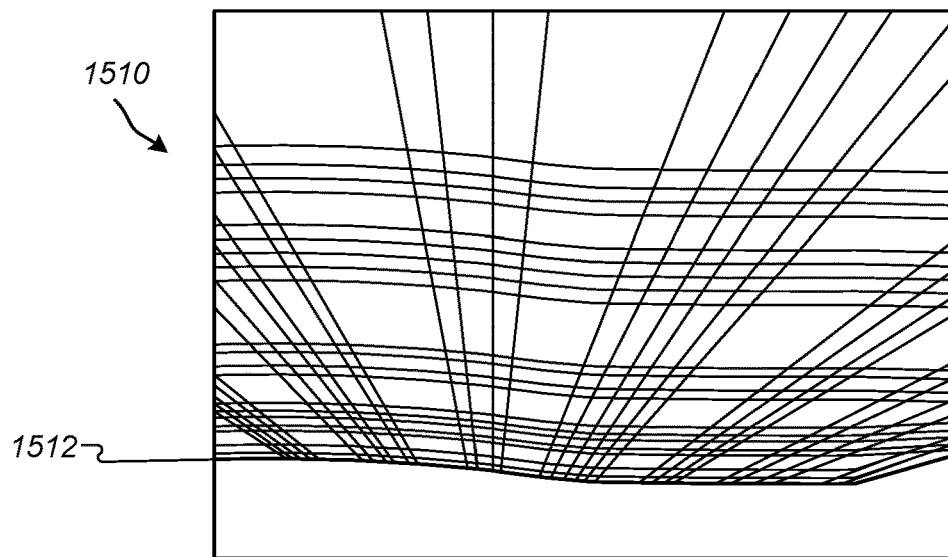
Figure 15C:
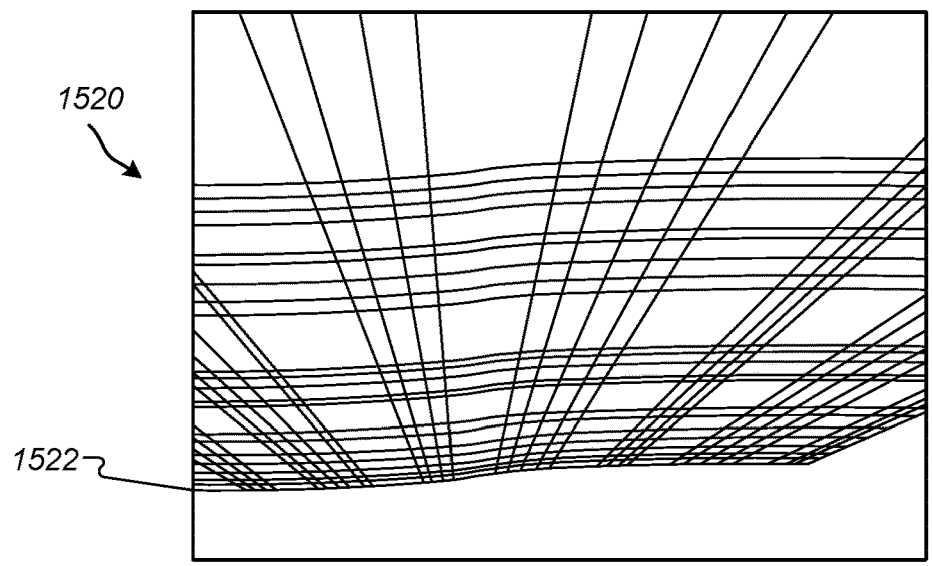

FIGS. 15A-C illustrate examples of approximated planar perspective projection applied to planes of an image. FIG. 15A shows a planar perspective projection taken from a panorama using techniques described in this disclosure. The depicted plane view 1500 can represent an overlay of the plane shown in the image in FIG. 14B, for example. In particular, FIG. 15A represents a corrected FIG. 14A where the curved lines are projected into straight lines. Here, the plane 1500 of the panorama is shown at a distance of one meter (with a 90 degree horizontal field of view). The lines 1502, 1504, 1506, and 1508 are straight, whereas before (corresponding to FIG. 14A), the same centerlines were curved and distorted.

Other distortions can occur based on the selected projection scheme. For example, FIG. 15B and FIG. 15C represent planes (1510 and 1520) generated using planar perspective projection taken from a panorama using techniques in this disclosure. The panorama was captured at a distance of 25 centimeters (90 degrees horizontal field of view). FIG. 15B shows the left eye capture 1510 and FIG. 15C shows the right eye capture 1520. Here, the bottoms of the planes (1512, 1522) do not project to a straight line and vertical parallax is introduced. This particular deformation can occur when planar perspective projection is used.

Figure 16A:
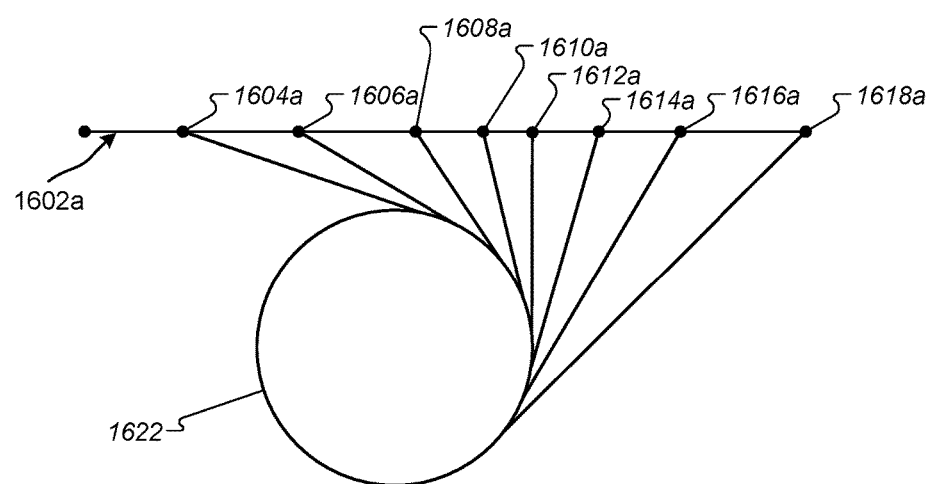
FIGS. 16A-B illustrate examples of introducing vertical parallax.
Figure 16B:
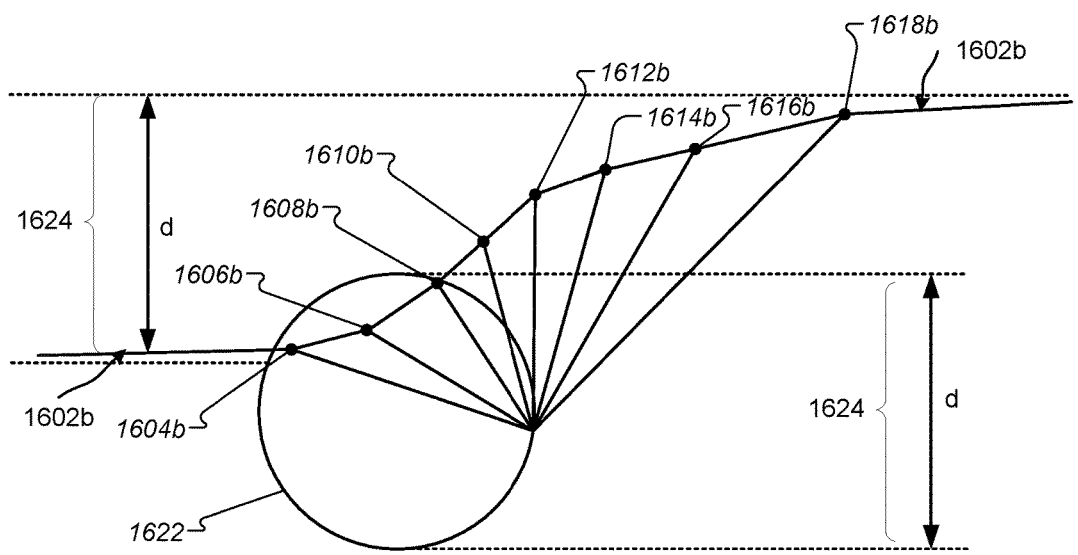

FIGS. 16A-B illustrate examples of introducing vertical parallax. FIG. 16A depicts a straight line 1602a being captured according to typical omnistereo panoramic techniques. In the depicted example, each ray 1604a-1618a originates from a different point on the circle 1622.

FIG. 16B depicts the same straight line when viewed using a perspective approximation technique. As shown, the straight line 1602a is shown deformed as line 1602b. Rays 1604b-1618b originate from a single point on the circle 1622. The deformation can have the effect of bringing the left half of the line 1602b toward the viewer and pushing the right half of the line away form the viewer. For the left eye, the opposite can occur, i.e., the left half of the line appears further away while the right half of the line appears closer. The deformed line curves between two asymptotes, which are separated by a distance equal to the diameter 1624 of the panorama rendering circle 1622. Since the deformation is shown as being the same size as the panorama capture radius, it may only be noticeable on nearby objects. This form of deformation can lead to vertical parallax for a user viewing an image, which can cause fusing difficulty when stitching processes are performed on the distorted images.

FIGS. 17A-B depict example points of a coordinate system that can be used to illustrate points in a 3D panorama. FIGS. 17A-B depict a point (0, Y, Z) 1702 imaged by the panoramic techniques described in this disclosure. The point's projection into the left and right panoramas can be represented by $(-\theta, \phi)$ and $(\theta, \phi)$, respectively as shown below in equations (1) and (2) where:

$$\cos(\theta) = \frac{r}{Z} \quad (1)$$

$$\tan(\phi) = \frac{Y}{\sqrt{Z^2 - r^2}} \quad (2)$$

and where r 1704 is the radius of the panoramic capture.

FIG. 17A depicts a top down view of the panoramic imaging of the point (0, Y, Z) 1702. FIG. 17B depicts a side view of the panoramic imaging of the point (0, Y, Z) 1702. The point shown projects to (−θ, φ) in the left panorama and projects to (θ, φ) in the right panorama. These particular views are as captured and have not been projected into another plane.

Figure 18:
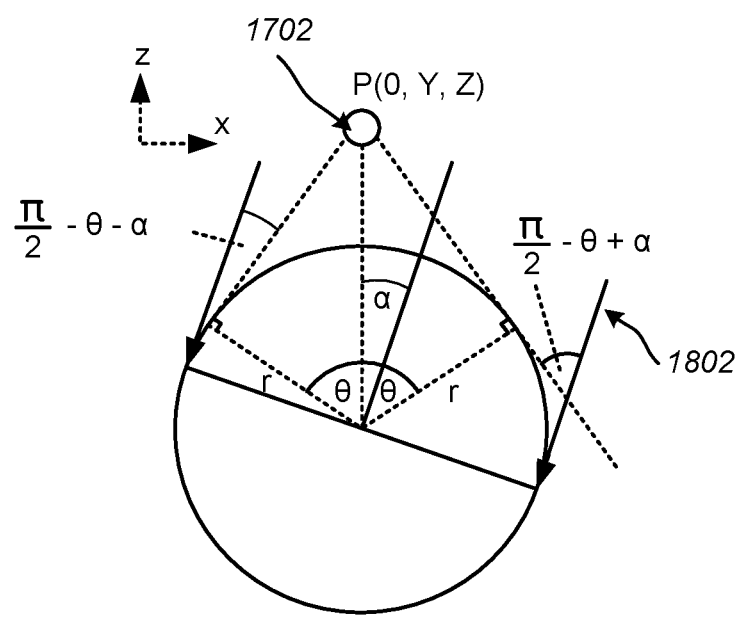
FIG. 18 represents a projected view of the point depicted in FIGS. 17A-17B.

FIG. 18 represents a projected view of the point depicted in FIGS. 17A-17B. Here, the perspective view of point 1702 is oriented to look horizontally with a rotation of angle [α] about the y-axis, as shown in FIG. 18 by 1802. Since this perspective projection only considers ray direction, it is possible to find the rays the point 1702 projects along by transforming the rays that see the point 1702 in the panoramic projection 1802 into a perspective camera's reference frame. For example, the point 1702 projects along the following rays shown in Table 1 below:

TABLE 1

|   | Left image ray | Right image ray |
|---|---|---|
| x | $\cos(\phi)\sin\left(\frac{\pi}{2} - \theta - \alpha\right)$ | $\cos(\phi)\sin\left(-\frac{\pi}{2} + \theta - \alpha\right)$ |
| y | $\sin(\phi)$ | $\sin(\phi)$ |
| z | $\cos(\phi)\cos\left(\frac{\pi}{2} - \theta - \alpha\right)$ | $\cos(\phi)\cos\left(-\frac{\pi}{2} + \theta - \alpha\right)$ |

Performing a perspective division, the point projection can be determined, as shown by equations in Table 2 below:

TABLE 2

|   | Left image | Right image |
|---|---|---|
| x | $\tan\left(\frac{\pi}{2} - \theta - \alpha\right)$ | $\tan\left(-\frac{\pi}{2} + \theta - \alpha\right)$ |
| y | $\dfrac{\tan(\phi)}{\cos\left(\frac{\pi}{2} - \theta - \alpha\right)}$ | $\dfrac{\tan(\phi)}{\cos\left(-\frac{\pi}{2} + \theta - \alpha\right)}$ |

It can be seen that if $$\theta = \frac{\pi}{2}$$

(corresponding to the original 3D point 1702 being infinitely far away), then the point 1702 will generally project to the same y-coordinate in both perspective images and so there will be no vertical parallax. However as θ becomes further from $$\frac{\pi}{2}$$

(as the point moves closer to the camera), the projected y-coordinates will differ for the left and right eyes (except for the case where α=0 which corresponds to the perspective view looking towards the point 1702.

In some implementations, distortion can be avoided by capturing images and scenes in a particular manner. For example, capturing scenes within a near field to the camera (i.e., less than one meter away) can cause distortion elements to appear. Therefore, capturing scenes or images from one meter outward is a way to minimize distortions.

In some implementations, distortion can be corrected using depth. For example, given accurate depth information for a scene, it may be possible to correct for the distortion. That is, since the distortion can depend on the current viewing direction, it may not be possible to apply a single distortion to the panoramic images before rendering. Instead, depth information can be passed along with the panoramas and used at render time.

Figure 19:
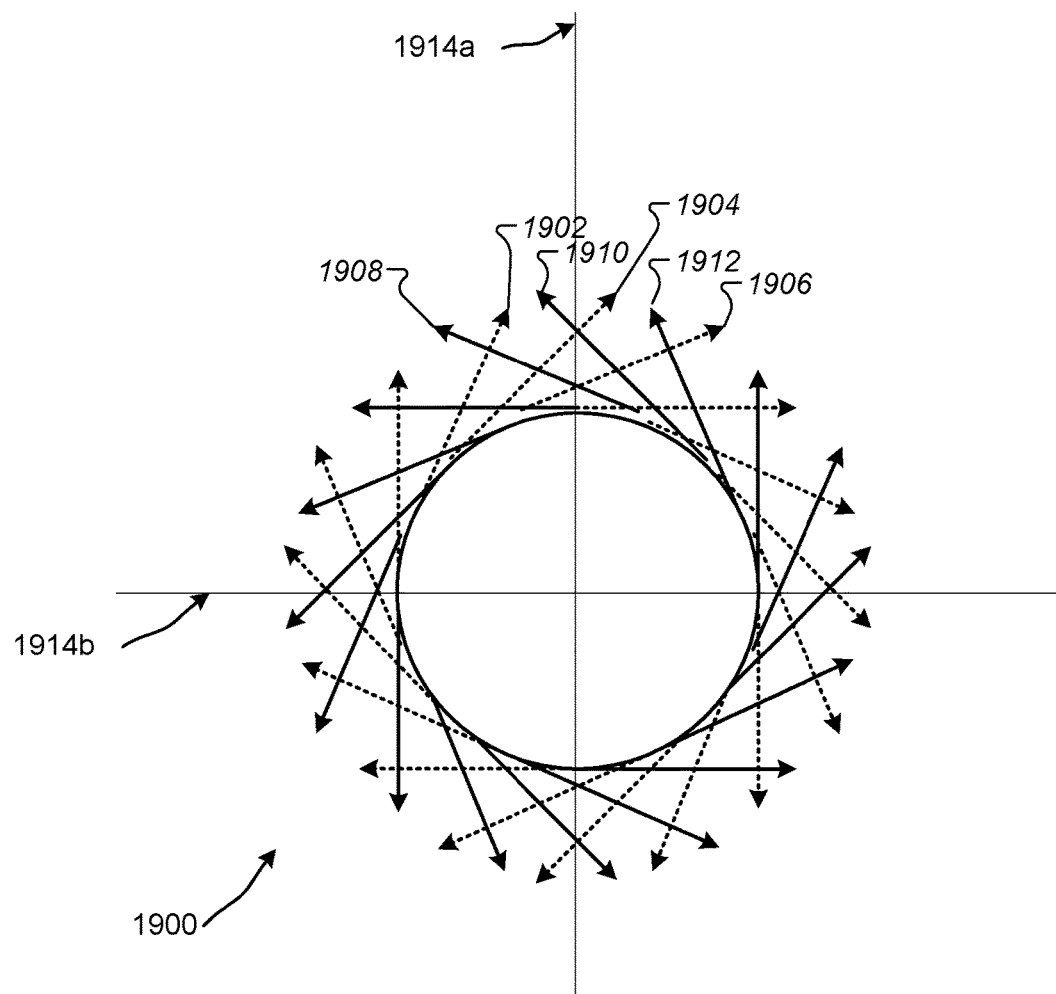
FIG. 19 illustrates rays captured in an omnidirectional stereo image using the panoramic imaging techniques described in this disclosure.

FIG. 19 illustrates rays captured in an omnidirectional stereo image using the panoramic imaging techniques described in this disclosure. In this example, rays 1902, 1904, 1906 pointing in a clockwise direction around circle 1900 correspond to rays for the left eye. Similarly, rays 1908, 1910, 1912 pointing in a counter-clockwise direction around circle 1900 correspond to rays for the right eye. Each counter-clockwise ray can have a corresponding clockwise ray on the opposite side of the circle looking in the same direction. This can provide a left/right viewing ray for each of the directions of rays represented in a single image.

Capturing a set of rays for the panoramas described in this disclosure can include moving a camera (note shown) around on the circle 1900 aligning the camera tangential to the circle 1900 (e.g., pointing the camera lens facing outward at the scene and tangential to the circle 1900). For the left eye, the camera can be pointed to the right (e.g., ray 1904 is captured to the right of center line 1914a). Similarly, for the right eye, the camera can be pointed to the left (e.g., ray 1910 is captured to the left of center line 1914a). Similar left and right areas can be defined using centerline 1914b for cameras on the other side of the circle 1900 and below centerline 1914b. Producing omnidirectional stereo images works for real camera capture or for previously rendered computer graphic (CG) content. View interpolation can be used with both captured camera content and rendered CG content to simulate capturing the points in between the real cameras on the circle 1900, for example.

Stitching a set of images can include using a spherical/equirectangular projection for storing the panoramic image. In general, two images exist in this method, one for each eye. Each pixel in the equirectangular image corresponds to a direction on the sphere. For example, the x-coordinate can correspond to longitude and the y-coordinate can correspond to latitude. For a mono-omnidirectional image, the origins of the viewing rays for the pixels can be the same point. However, for the stereo image, each viewing ray can also originate from a different point on the circle 1900. The panoramic image can then be stitched form the captured images, by analyzing each pixel in the captured image, generating an ideal viewing ray form a projection model, and sampling the pixels form the captured or interpolated images whose viewing rays most closely match the ideal ray. Next, the ray values can be blended together to generate a panoramic pixel value.

In some implementations, optical flow-based view interpolation can be used to produce at least one image per degree on the circle 1900. In some implementations, entire columns of the panoramic image can be filled at a time because it can be determined that if one pixel in the column would be sampled from a given image, then the pixels in that column will be sampled from that same image.

The panoramic format used with capture and rendering aspects of this disclosure can ensure that the image coordinates of an object viewed by left and right eyes only differ by a horizontal shift. This horizontal shift is known as parallax. This holds for equirectangular projection, and in this projection, objects can appear quite distorted.

The magnitude of this distortion can depend on a distance to the camera and a viewing direction. The distortion can include line-bending distortion, differing left and right eye distortion, and in some implementations, the parallax may no longer appear horizontal. In general, 1-2 degrees (on a spherical image plane) of vertical parallax can be comfortably tolerated by human users. In addition, distortion can be ignored for objects in the peripheral eye line. This correlates to about 30 degrees away from a central viewing direction. Based on these findings, limits can be constructed that define zones near the camera where objects should not penetrate to avoid uncomfortable distortion.

Figure 20:
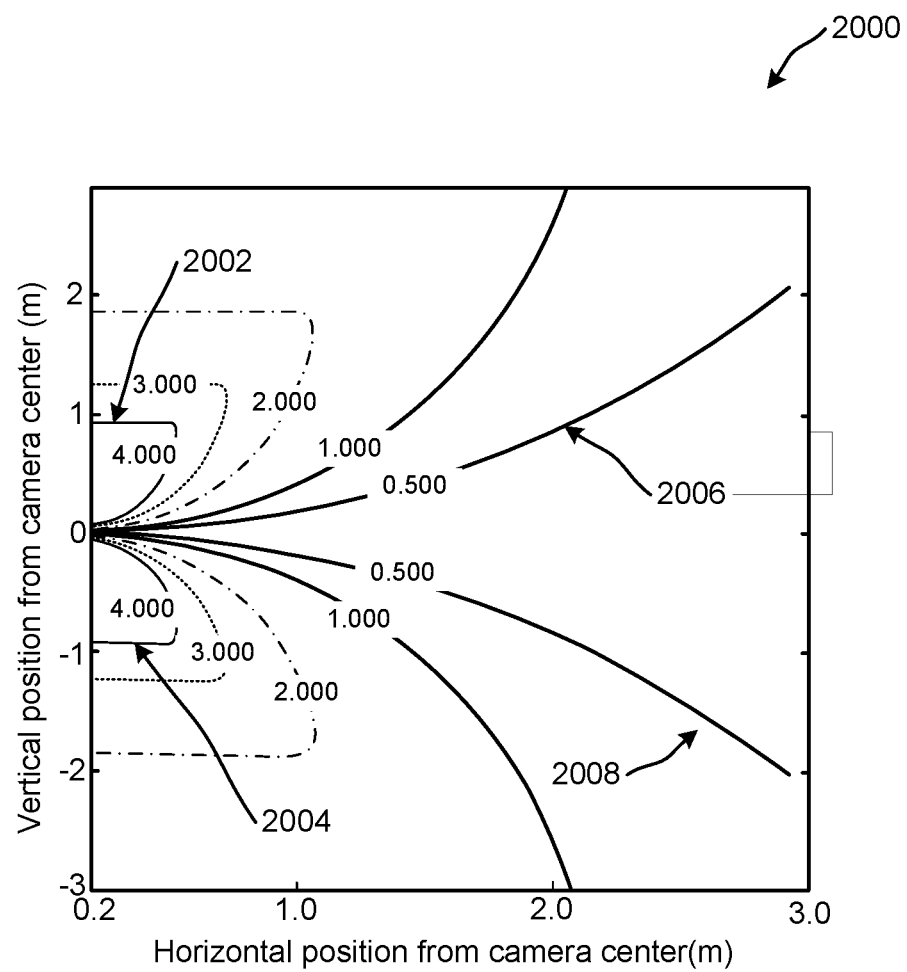
FIG. 20 is a graph that illustrates a maximum vertical parallax caused by points in 3D space.

FIG. 20 is a graph 2000 that illustrates a maximum vertical parallax caused by points in 3D space. In particular, the graph 2000 depicts the maximum vertical parallax in degrees caused by points in 3D space given that they project to 30 degrees from the center of an image. The graph 2000 plots a vertical position from a camera center (in meters) against a horizontal position from the camera (in meters). In this figure, the camera is location at the origin [0, 0]. As the graph moves away from the origin, the severity of the distortion becomes less. For example, from about zero to one 2002 and from zero to minus one 2004 (vertically) on the graph, the distortion is the worst. This corresponds to images directly above and below the camera (placed at the origin). As the scene moves outward, the distortion is lessened and by the time the camera images the scene at points 2006 and 2008, only one-half a degree of vertical parallax is encountered.

If the distortion in the periphery can be ignored beyond 30 degrees, then all pixels whose viewing direction is within 30 degrees of the poles can be removed. If the peripheral threshold is allowed to be 15 degrees, then 15 degrees of pixels can be removed. The removed pixels can, for example, be set to a color block (e.g., black, white, magenta, etc.) or a static image (e.g., a logo, a known boundary, a texturized layer, etc.) and the new representation of the removed pixels can be inserted into the panorama in place of the removed pixels. In some implementations, the removed pixels can be blurred and the blurred representation of the removed pixels can be inserted into the panorama in place of the removed pixels.

Figure 21:
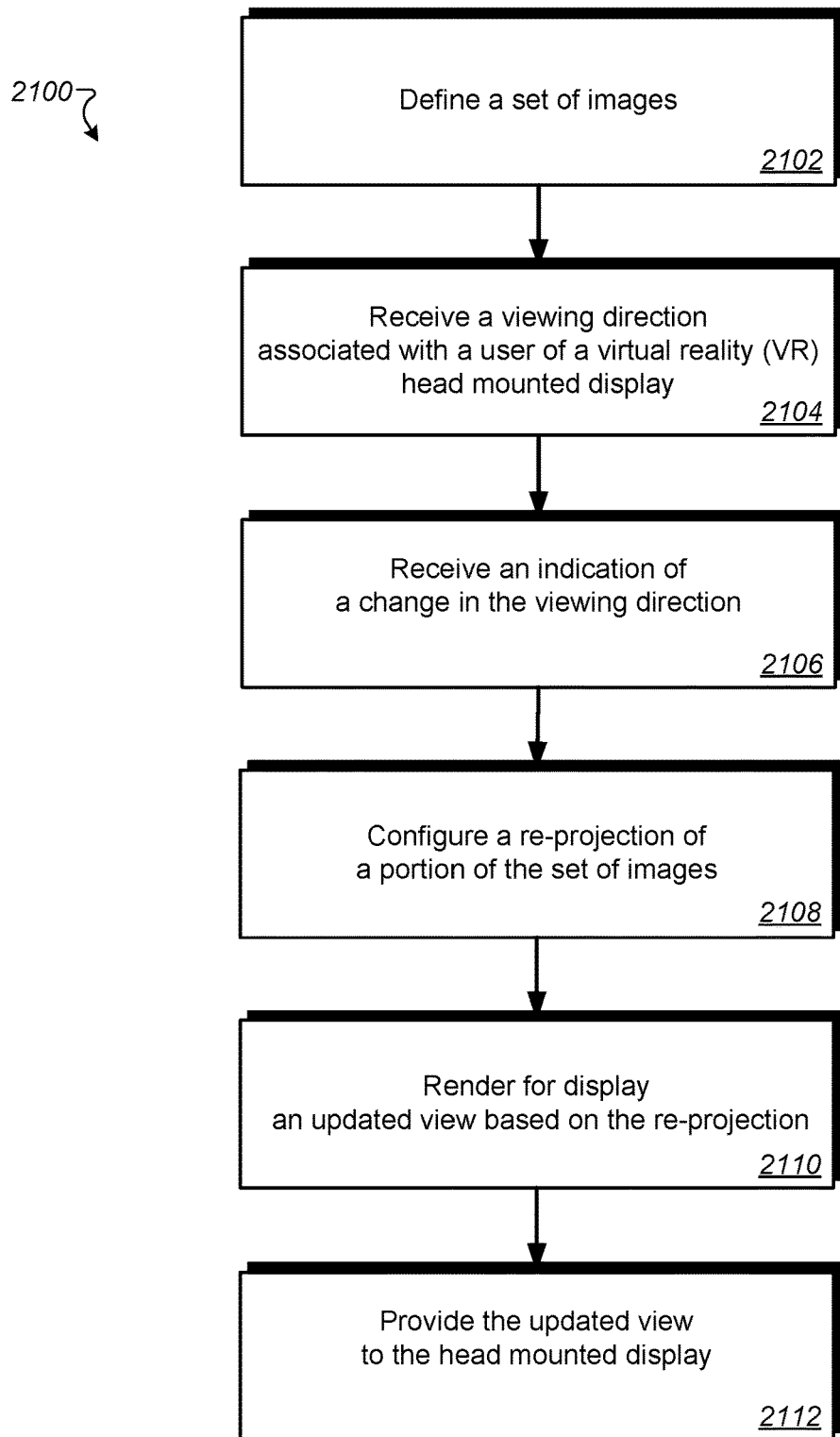
FIG. 21 is a flow chart diagramming one embodiment of a process to produce a stereo panoramic image.

FIG. 21 is a flow chart diagramming one embodiment of a process 2100 to produce a stereo panoramic image. As shown in FIG. 21, at block 2102, the system 100 can define a set of images based on captured images. The images can include pre-processed images, post-processed images, virtual content, video, image frames, portions of image frames, pixels, etc.

The defined images can be accessed by a user, accessing content (e.g., VR content) with the use of a head mounted display (HMD), for example. The system 100 can determine particular actions performed by the user. For example, at some point, the system 100 can receive, as at block 2104, a viewing direction associated with a user of the VR HMD. Similarly, if the user changes her viewing direction, the system can receive, as at block 2106, an indication of a change in the user's viewing direction.

In response to receiving the indication of such a change in viewing direction, the system 100 can configure a re-projection of a portion of the set of images, shown at block 2108. The re-projection may be based at least in part on the changed viewing direction and a field of view associated with the captured images. The field of view may be from one to 180 degrees and can account for slivers of images of a scene to full panoramic images of the scene. The configured re-projection can be used to convert a portion of the set of images from a spherical perspective projection into a planar projection. In some implementations, the re-projection can include recasting a portion of viewing rays associated with the set of images from a plurality of viewpoints arranged around a curved path from a spherical perspective projection to a planar perspective projection.

Upon completing the re-projection, the system 100 can render an updated view based on the re-projection, as shown at block 2110. The updated view can be configured to correct distortion and provide stereo parallax to a user. At block 2112, the system 100 can provide the updated view including a stereo panoramic scene corresponding to the changed viewing direction. For example, the system 100 can provide the updated view to correct distortion in the original view (before re-projection) and can provide a stereo parallax effect in a display of a VR head mounted display.

Figure 22:
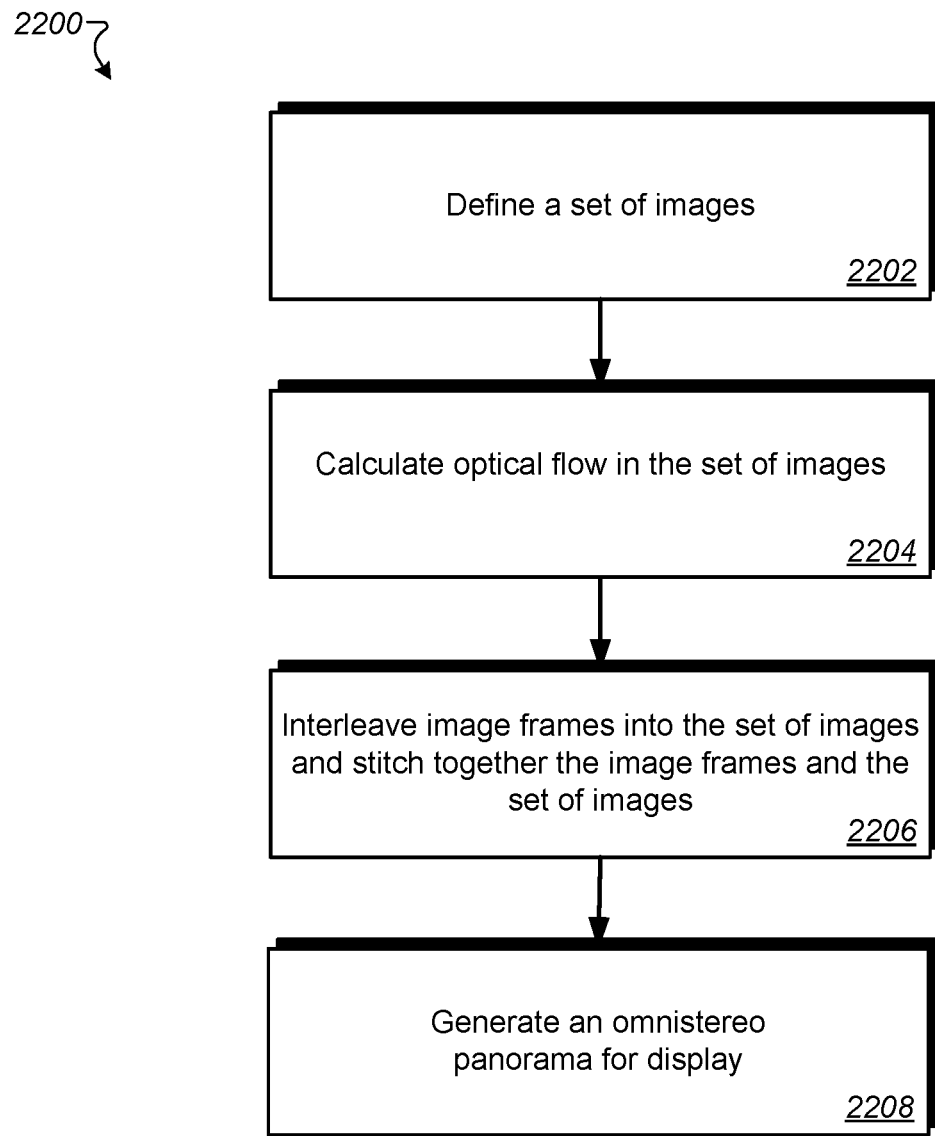
FIG. 22 is a flow chart diagramming one embodiment of a process to capture a stereo panoramic image.

FIG. 22 is a flow chart diagramming one embodiment of a process 2200 to capture a stereo panoramic image. At block 2202, the system 100 can define a set of images based on captured video streams collected from at least one stereo pair of cameras. For example, the system 100 can use a stereo pair (as shown in FIG. 2 and FIG. 5) or multiple stereo pairs (as shown in FIG. 3 and FIG. 6). In some implementations, the system 100 can define the set of images using captured video streams collected from about 6 to about 8 stereo pairs. In some implementations, the system 100 can define the set of images using partial or all rendered computer graphics (CG) content.

At block 2204, the system 100 can calculate optical flow in the set of images. For example, calculating optical flow in the set of images can include analyzing image intensity fields for a portion of columns of pixels associated with the set of images and performing optical flow techniques on the portion of columns of pixels, as described in detail above.

In some implementations, the optical flow can be used to interpolate image frames that are not part of the set of images, (shown by block 2206) and as described in detail above. The system 100 can then stitch together the image frames and the set of images based at least in part on the optical flow. At block 2208, the system 100 can use the interleaved frames and set of images to generate an omnistereo panorama for display in a VR head mounted display. In some implementations, the system 100 can perform the image stitching using pose information associated with the at least one stereo pair to, for example, pre-stitch a portion of the set of images before performing the interleaving.

Figure 23:
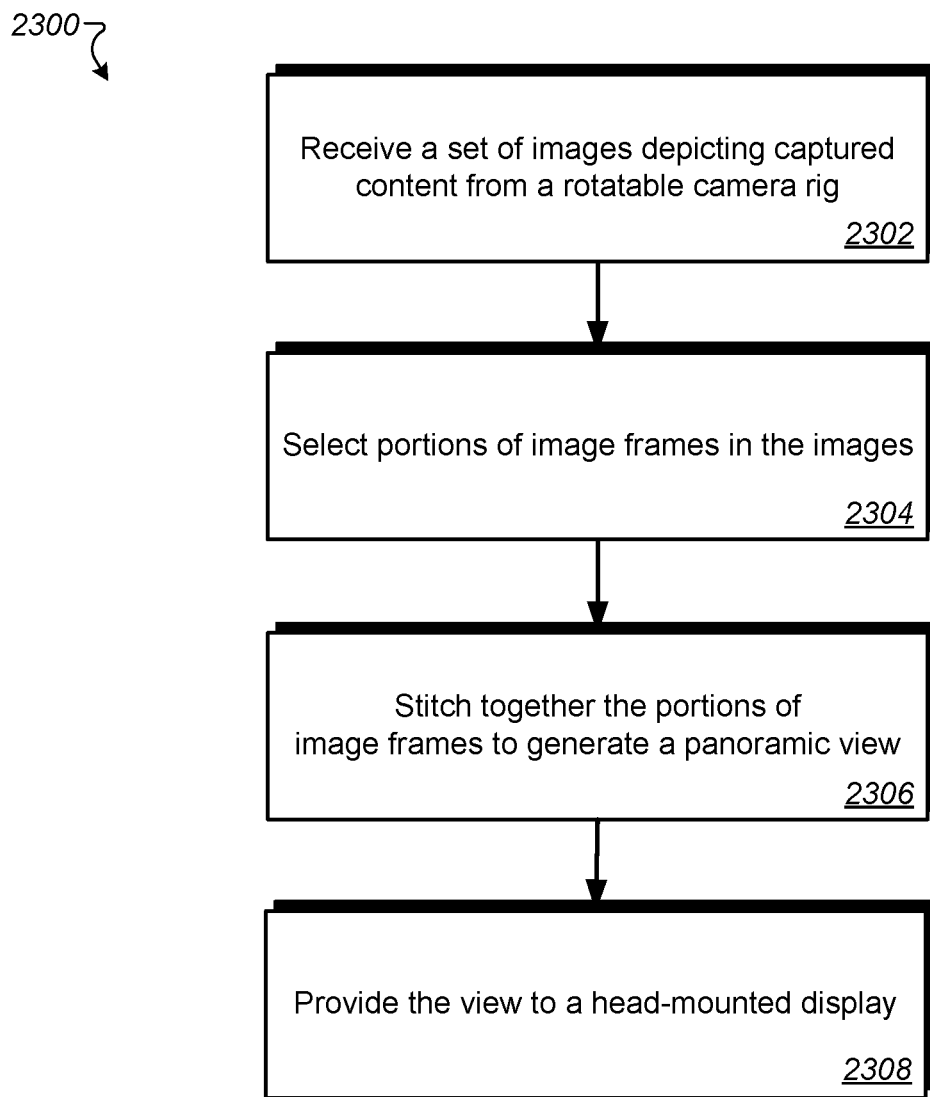
FIG. 23 is a flow chart diagramming one embodiment of a process to render panoramic images in a head mounted display.

FIG. 23 is a flow chart diagramming one embodiment of a process 2300 to render panoramic images in a head mounted display. As shown in FIG. 23, at block 2302, the system 100 can receive a set of images. The images may depict captured content from a rotatable camera rig. At block 2304, the system 100 can select portions of image frames in the images. The image frames may include content captured with the camera rig. The system 100 can use any portion of the captured content. For example, the system 100 may select a portion of image frames that include content captured by the rig from a distance of about one radial meter from an outward edge of a base of the camera rig to about five radial meters from the outward edge of the base of the camera rig. In some implementations, this selection can be based on how far a user may perceive 3D content. Here, the distance of one meter from the camera to about five meters from the camera may represent a "zone" in which a user can view 3D content. Shorter than that, the 3D view may be distorted and longer than that, the user may not be able to ascertain 3D shapes. That is, the scene may simply look 2D from afar.

At block 2306, the selected portions of image frames can be stitched together to generate a stereoscopic panoramic view. In this example, the stitching may be based at least in part on matching the selected portions to at least one other image frame in the selected portions. At block 2308, the panoramic view can be provided in a display, such as an HMD device. In some implementations, the stitching can be performed using a stitching ratio selected based at least in part on the diameter of the camera rig. In some implementations, the stitching includes a number of steps of matching a first column of pixels in a first image frame to a second column of pixels in a second image frame, and matching the second column of pixels to a third column of pixels in a third image frame to form a cohesive scene portion. In some implementations, many columns of pixels can be matched and combined in this fashion to form a frame and those frames can be combined to form an image. Further, those images can be combined to form a scene.

In some implementations, the method 2300 can include an interpolation step that uses system 100 to interpolate additional image frames that are not part of the portions of image frames. Such an interpolation can be performed to ensure flow occurs between images captured by cameras that are far apart, for example. Once the interpolation of additional image content is performed, the system 100 can interleave the additional image frames into the portions of image frames to generate virtual content for the view. This virtual content can be stitched together as portions of image frames interleaved with the additional image frames. The result can be provided as an updated view to the HMD, for example. This updated view may be based at least in part on the portions of image frames and the additional image frames.

Figure 24:
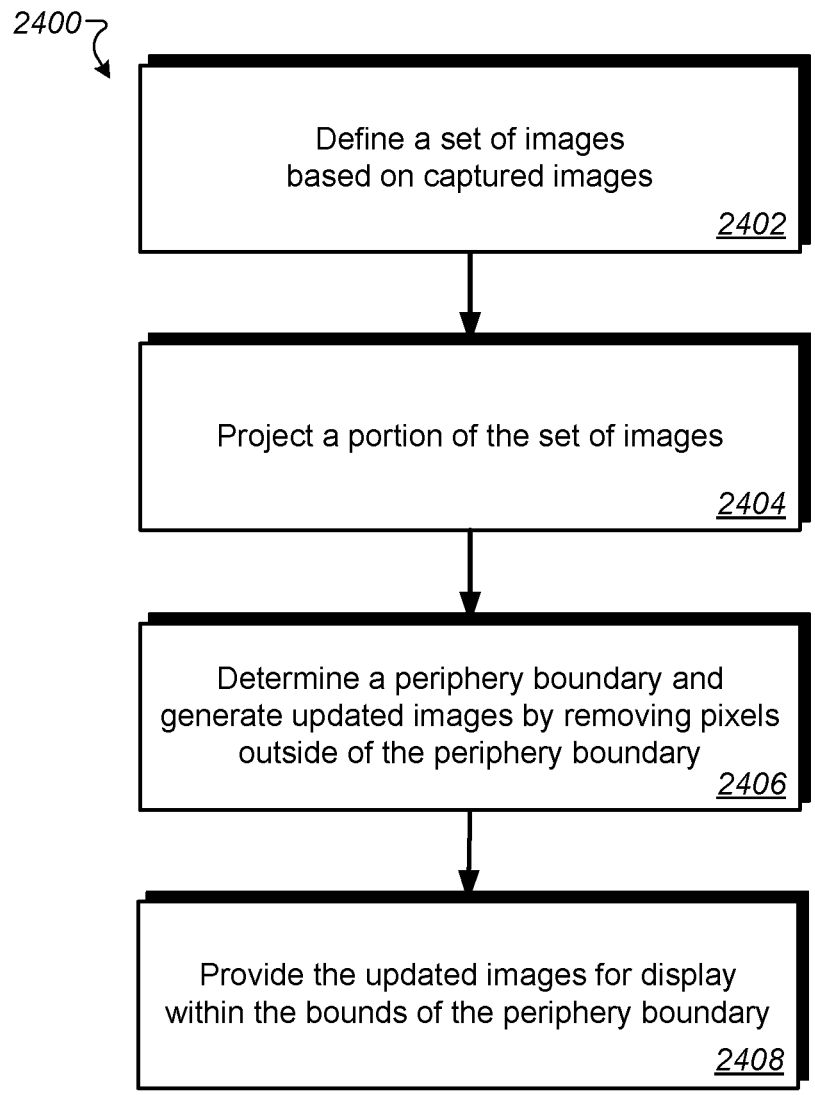
FIG. 24 is a flow chart diagramming one embodiment of a process to determine image boundaries.

FIG. 24 is a flow chart diagramming one embodiment of a process 2400 to determine image boundaries. At block 2402, the system 100 can define a set of images based on captured video streams collected from at least one stereo pair of cameras. For example, the system 100 can use a stereo pair (as shown in FIG. 2 and FIG. 5) or multiple stereo pairs (as shown in FIG. 3 and FIG. 6). In some implementations, the system 100 can define the set of images using captured video streams collected from about 6 to about 8 stereo pairs. In some implementations, the system 100 can define the set of images using partial or all rendered computer graphics (CG) content. In some implementations, the video streams corresponding to the set of images include encoded video content. In some implementations, the video streams corresponding to the set of images may include content acquired with at least one stereo camera pair configured with a one-hundred eighty degree field of view.

At block 2404, the system 100 can project a portion of the set of images from a perspective image plane onto a spherical image plane by recasting viewing rays associated with the portion of the set of images from multiple viewpoints arranged in a portion of a circular-shaped path to one viewpoint. For example, the set of images can be captured by a circular camera rig, which can host a number of cameras. Each camera can be associated with a view point and those view points are directed outward from the camera rig at a scene. In particular, instead of originating from a single point, viewing rays originate from each camera on the rig. The system 100 can recast rays from the various viewpoints on the path into a single viewpoint.

At block 2406, the system 100 can determine a periphery boundary corresponding to the single viewpoint and generate updated images by removing pixels outside of the periphery boundary. The periphery boundary may delineate clear concise image content from distorted image content. In some implementations, the periphery boundary may pertain to views outside of a user's typical peripheral view area. Removing such pixels can ensure that the user is not unnecessarily presented with distorted image content. Removing the pixels can include replacing the pixels with a color block, a static image, or a blurred representation of the pixels, as discussed in detail above. In some implementations, the periphery boundary is defined to a field of view of about 150 degrees for one or more cameras associated with the captured images. In some implementations, the periphery boundary is defined to a field of view of about 120 degrees for one or more cameras associated with the captured images. In some implementations, the periphery boundary is a portion of a spherical shape corresponding to about 30 degrees above a viewing plane for a camera associated with the captured images, and removing the pixels includes blacking out or removing a top portion of a spherical scene. In some implementations, the periphery boundary is a portion of a spherical shape corresponding to about 30 degrees below a viewing plane for a camera associated with the captured images, and removing the pixels includes blacking out or removing a top portion of a spherical scene. At block 2408, the system 100 can provide the updated images for display within the bounds of the periphery boundary.

In some implementations, the method 2400 can also include stitching together at least two frames in the set of images. The stitching can include a step of sampling columns of pixels from the frames and interpolating, between at least two sampled columns of pixels, additional columns of pixels that are not captured in the frames. In addition, the stitching can include a step of blending the sampled columns and the additional columns together to generate a pixel value. In some implementations, blending can be performed using a stitching ratio selected based at least in part on a diameter of a circular camera rig used to acquire the captured images. The stitching can also include a step of generating a three-dimensional stereoscopic panorama by configuring the pixel value into a left scene and a right scene, which can be provided for display in an HMD, for example.

Figure 25:
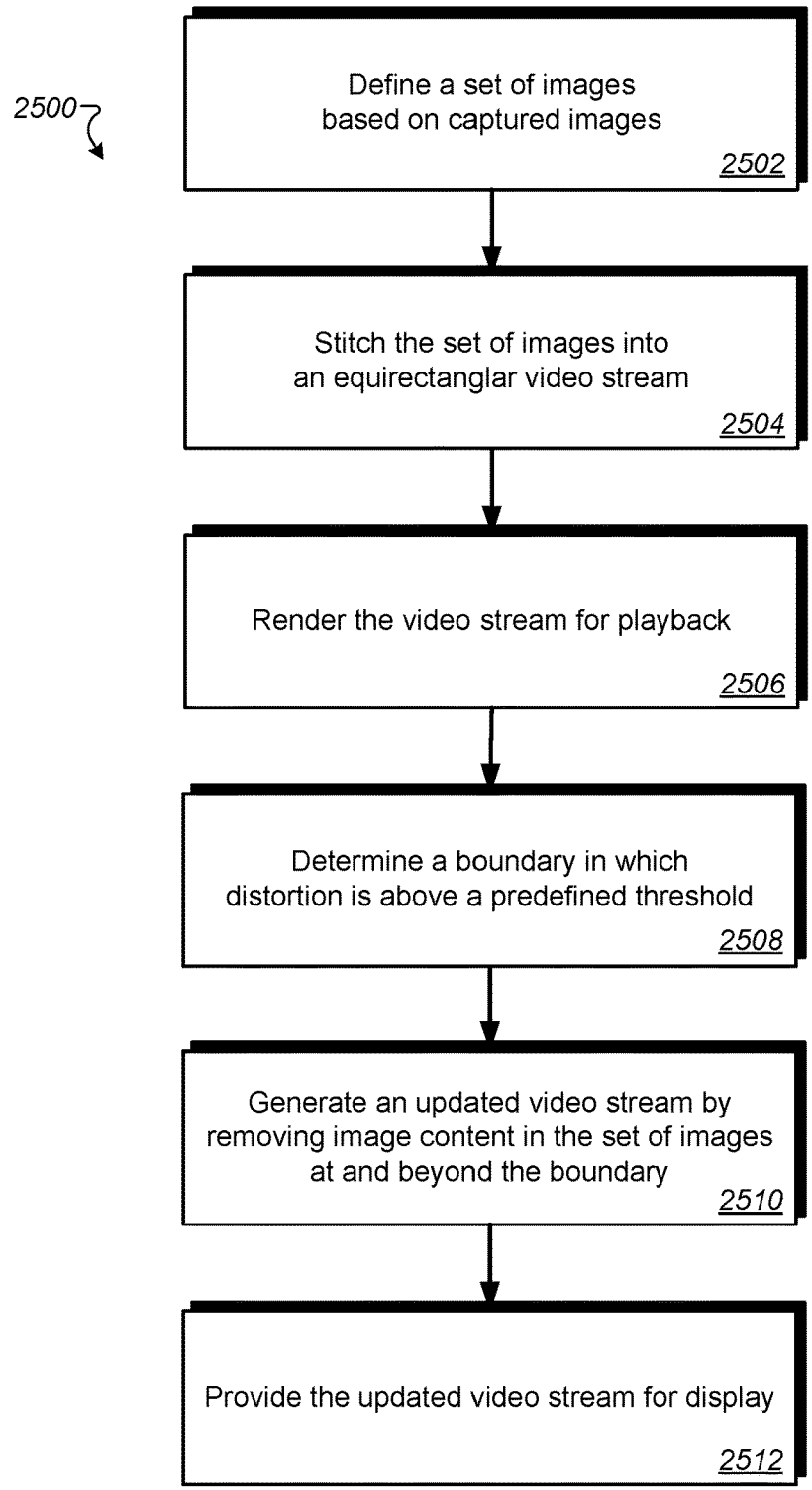
FIG. 25 is a flow chart diagramming one embodiment of a process to generate video content.

FIG. 25 is a flow chart diagramming one embodiment of a process 2500 to generate video content. At block 2502, the system 100 can define a set of images based on captured video streams collected from at least one stereo pair of cameras. For example, the system 100 can use a stereo pair (as shown in FIG. 2 and FIG. 5) or multiple stereo pairs (as shown in FIG. 3 and FIG. 6). In some implementations, the system 100 can define the set of images using captured video streams collected from about 6 to about 8 stereo pairs. In some implementations, the system 100 can define the set of images using partial or all rendered computer graphics (CG) content.

At block 2504, the system 100 can stitch the set of images into an equirectangular video stream. For example, the stitching can include combining images associated with a leftward camera capture angle with images associated with a rightward facing camera capture angle.

At block 2506, the system can render the video stream for playback by projecting the video stream from equirectangular to perspective for a first view and a second view. The first view may correspond to a left eye view of a head-mounted display and the second view may correspond to a right eye view of the head-mounted display.

At block 2508, the system can determine a boundary in which distortion is above a predefined threshold. The predefined threshold may provide a level of parallax, level of mismatch, and/or a level of error allowable within a particular set of images. The distortion may be based at least in part on projection configuration when projecting the video stream from one plane or view to another plane or view, for example.

At block 2510, the system can generate an updated video stream by removing image content in the set of images at and beyond the boundary, as discussed in detail above. Upon updating the video stream, the updated stream can be provided for display to a user of an HMD, for example. In general, systems and methods described throughout this disclosure can function to capture images, remove distortion from the captured images, and render images in order to provide a 3D stereoscopic view to a user of an HMD device.

Figure 26:
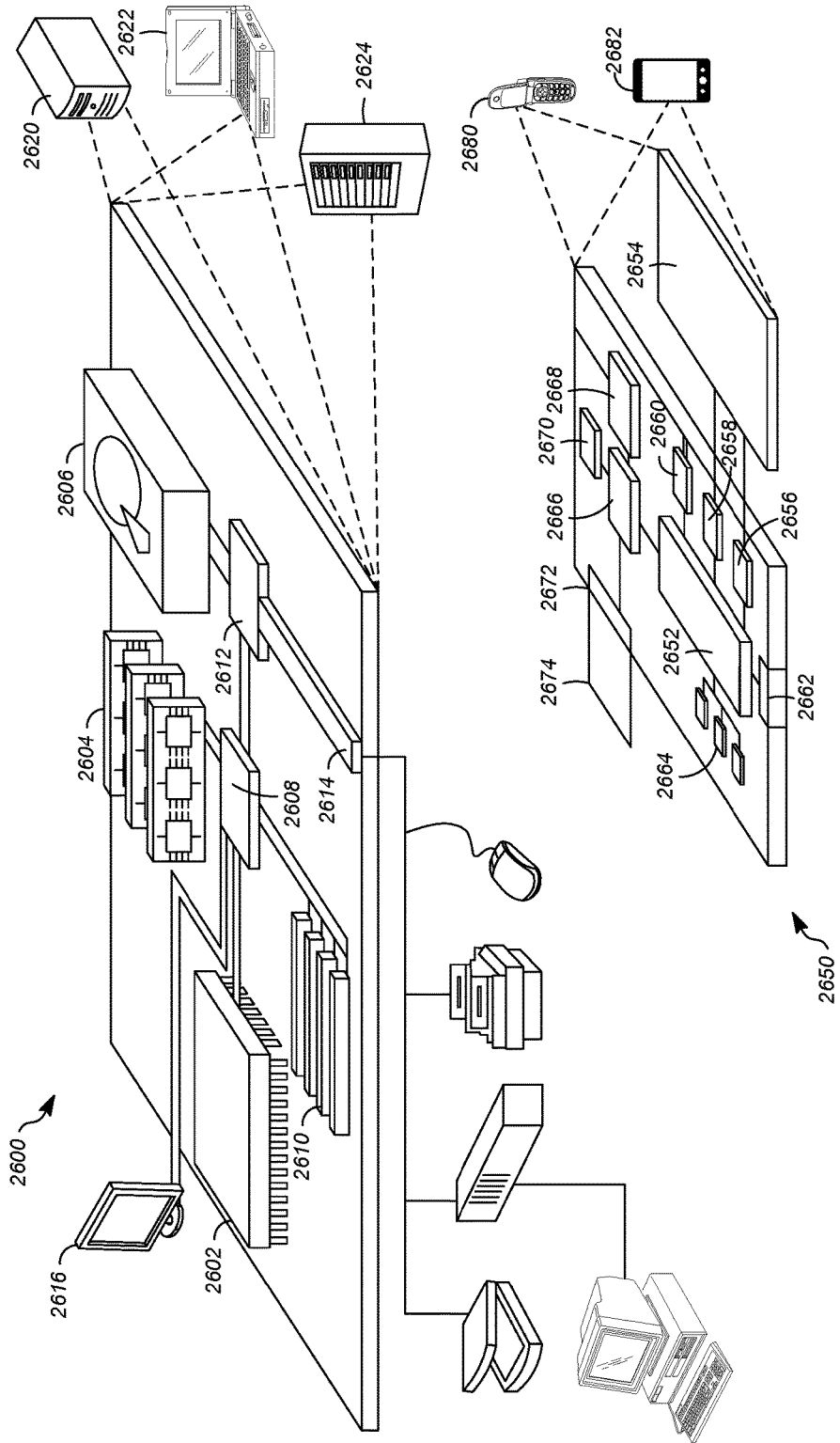
FIG. 26 shows an example of a computer device and a mobile computer device that can be used to implement the techniques described here.

FIG. 26 shows an example of a generic computer device 2600 and a generic mobile computer device 2650, which may be used with the techniques described here. Computing device 2600 is intended to represent various forms of digital computers, such as laptops, desktops, workstations, personal digital assistants, servers, blade servers, mainframes, and other appropriate computers. Computing device 2650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 2600 includes a processor 2602, memory 2604, a storage device 2606, a high-speed interface 2608 connecting to memory 2604 and high-speed expansion ports 2610, and a low speed interface 2612 connecting to low speed bus 2614 and storage device 2606. Each of the components 2602, 2604, 2606, 2608, 2610, and 2612, are interconnected using various busses, and may be mounted on a common motherboard or in other manners as appropriate. The processor 2602 can process instructions for execution within the computing device 2600, including instructions stored in the memory 2604 or on the storage device 2606 to display graphical information for a GUI on an external input/output device, such as display 2616 coupled to high speed interface 2608. In other implementations, multiple processors and/or multiple buses may be used, as appropriate, along with multiple memories and types of memory. Also, multiple computing devices 2600 may be connected, with each device providing portions of the necessary operations (e.g., as a server bank, a group of blade servers, or a multi-processor system).

The memory 2604 stores information within the computing device 2600. In one implementation, the memory 2604 is a volatile memory unit or units. In another implementation, the memory 2604 is a non-volatile memory unit or units. The memory 2604 may also be another form of computer-readable medium, such as a magnetic or optical disk.

The storage device 2606 is capable of providing mass storage for the computing device 2600. In one implementation, the storage device 2606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2604, the storage device 2606, or memory on processor 2602.

The high speed controller 2608 manages bandwidth-intensive operations for the computing device 2600, while the low speed controller 2612 manages lower bandwidth-intensive operations. Such allocation of functions is exemplary only. In one implementation, the high-speed controller 2608 is coupled to memory 2604, display 2616 (e.g., through a graphics processor or accelerator), and to high-speed expansion ports 2610, which may accept various expansion cards (not shown). In the implementation, low-speed controller 2612 is coupled to storage device 2606 and low-speed expansion port 2614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2600 may be implemented in a number of different forms, as shown in the figure. For example, it may be implemented as a standard server 2620, or multiple times in a group of such servers. It may also be implemented as part of a rack server system 2624. In addition, it may be implemented in a personal computer such as a laptop computer 2622. Alternatively, components from computing device 2600 may be combined with other components in a mobile device (not shown), such as device 2650. Each of such devices may contain one or more of computing device 2600, 2650, and an entire system may be made up of multiple computing devices 2600, 2650 communicating with each other.

Computing device 2650 includes a processor 2652, memory 2664, an input/output device such as a display 2654, a communication interface 2666, and a transceiver 2668, among other components. The device 2650 may also be provided with a storage device, such as a microdrive or other device, to provide additional storage. Each of the components 2650, 2652, 2664, 2654, 2666, and 2668, are interconnected using various buses, and several of the components may be mounted on a common motherboard or in other manners as appropriate.

The processor 2652 can execute instructions within the computing device 2650, including instructions stored in the memory 2664. The processor may be implemented as a chipset of chips that include separate and multiple analog and digital processors. The processor may provide, for example, for coordination of the other components of the device 2650, such as control of user interfaces, applications run by device 2650, and wireless communication by device 2650.

Processor 2652 may communicate with a user through control interface 2658 and display interface 2656 coupled to a display 2654. The display 2654 may be, for example, a TFT LCD (Thin-Film-Transistor Liquid Crystal Display) or an OLED (Organic Light Emitting Diode) display, or other appropriate display technology. The display interface 2656 may comprise appropriate circuitry for driving the display 2654 to present graphical and other information to a user. The control interface 2658 may receive commands from a user and convert them for submission to the processor 2652. In addition, an external interface 2662 may be provide in communication with processor 2652, to enable near area communication of device 2650 with other devices. External interface 2662 may provide, for example, for wired communication in some implementations, or for wireless communication in other implementations, and multiple interfaces may also be used.

The memory 2664 stores information within the computing device 2650. The memory 2664 can be implemented as one or more of a computer-readable medium or media, a volatile memory unit or units, or a non-volatile memory unit or units. Expansion memory 2674 may also be provided and connected to device 2650 through expansion interface 2672, which may include, for example, a SIMM (Single In Line Memory Module) card interface. Such expansion memory 2674 may provide extra storage space for device 2650, or may also store applications or other information for device 2650. Specifically, expansion memory 2674 may include instructions to carry out or supplement the processes described above, and may include secure information also. Thus, for example, expansion memory 2674 may be provide as a security module for device 2650, and may be programmed with instructions that permit secure use of device 2650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2664, expansion memory 2674, or memory on processor 2652, that may be received, for example, over transceiver 2668 or external interface 2662.

Device 2650 may communicate wirelessly through communication interface 2666, which may include digital signal processing circuitry where necessary. Communication interface 2666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2668. In addition, short-range communication may occur, such as using a Bluetooth, Wi-Fi, or other such transceiver (not shown). In addition, GPS (Global Positioning System) receiver module 2670 may provide additional navigation- and location-related wireless data to device 2650, which may be used as appropriate by applications running on device 2650.

Device 2650 may also communicate audibly using audio codec 2660, which may receive spoken information from a user and convert it to usable digital information. Audio codec 2660 may likewise generate audible sound for a user, such as through a speaker, e.g., in a handset of device 2650. Such sound may include sound from voice telephone calls, may include recorded sound (e.g., voice messages, music files, etc.) and may also include sound generated by applications operating on device 2650.

The computing device 2650 may be implemented in a number of different forms, as shown in the figure. For example, it may be implemented as a cellular telephone 2680. It may also be implemented as part of a smart phone 2682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
   at least one processor;
   memory storing instructions that, when executed by the at least one processor, cause the system to perform operations including:
   receiving a set of images based on captured video streams collected from at least one stereo pair of cameras;
   calculating optical flow between images from the set of images to generate a plurality of image frames that are not part of the set of images, the calculating of the optical flow including analyzing image intensity fields for selected columns of pixels associated with the set of images;
   interleaving the plurality of image frames into the set of images at the respective selected columns of pixels and stitching together a portion of the plurality of image frames and the set of images based at least in part on the optical flow; and
   generating, using the portion of the plurality of image frames and the set of images, an omnistereo panorama.

2. The system of claim 1, wherein the omnistereo panorama is formatted for display in a head mounted display device.

3. The system of claim 1, wherein the set of images are based on captured video streams collected from 6 to 8 stereo pairs of cameras.

4. The system of claim 1, further comprising:
   obtaining pose information associated with the at least one stereo pair of cameras; and
   determining the portion of the plurality of image frames to stitch together with the set of images based on the pose information.

5. The system of claim 1, wherein the set of images correspond to rendered computer graphics (CG) content.

6. The system of claim 1, wherein the stitching is performed using a stitching ratio selected based at least in part on a diameter of a circular camera rig housing the at least one stereo pair of cameras used to obtain the captured images.

7. A computer program product tangibly embodied on a non-transitory computer-readable storage medium and comprising instructions that, when executed by at least one computing device, are configured to cause the at least one computing device to:
   receive a set of images based on captured video streams collected from at least one stereo pair of cameras;
   generate a plurality of image frames based at least in part on a calculated optical flow between images from the set of images, the calculated optical flow being based on analyzing image intensity fields for selected columns of pixels associated with the set of images;
   interleave the plurality of image frames into the set of images at the respective selected columns of pixels and stitching together a portion of the plurality of image frames and the set of images based at least in part on the optical flow; and
   generate, using the portion of the plurality of image frames and the set of images, an omnistereo panorama.

8. The computer program product of claim 7, wherein the omnistereo panorama is formatted for display in a head mounted display device.

9. The computer program product of claim 7, wherein the set of images are based on captured video streams collected from 6 stereo pairs of cameras.

10. The computer program product of claim 7, further comprising:
    obtaining pose information associated with the at least one stereo pair of cameras; and
    determining the portion of the plurality of image frames to stitch together with the set of images based on the pose information.

11. The computer program product of claim 7, wherein the set of images correspond to rendered computer graphics (CG) content.

12. The computer program product of claim 7, wherein the stitching is performed using a stitching ratio selected based at least in part on a diameter of a circular camera rig housing the at least one stereo pair of cameras used to obtain the captured images.

13. The system of claim 1, wherein the set of images include content captured using a rotatable camera rig, and the operations further comprise:
    selecting, with the processor, portions of the content, the portions of the content corresponding to the plurality of image frames captured at a distance of about one meter from an outward edge of a base of the camera rig to about five meters from the outward edge of the base of the camera rig; and
    stitching together the portions of the content.

14. The system of claim 13, wherein the operations further comprise:
    providing the omnistereo panorama to a head-mounted display device.

15. The system of claim 13, wherein the stitching together of the portions of content is based on matching one or more image aspects included in at least two of the plurality of image frames.

16. The system of claim 13, wherein the stitching of the portions of the content is performed using a stitching ratio selected based at least in part on a diameter of the rotatable camera rig that captured the content.

17. The system of claim 13, the operations further comprising:
    interpolating additional image frames that are not part of the portions of the content, and interleaving the additional image frames into the portions of the content;
    stitching together the portions of content and the additional image frames; and
    generating an updated stereoscopic panoramic view including the portions of the content and the additional image frames.

18. The system of claim 17, wherein stitching together the portions of the content and the additional image frames includes:
    matching a portion of a first column of pixels in a first image frame to a first portion of a second column of pixels in a second image frame,
    matching a second portion of the second column of pixels to a portion of a third column of pixels in a third image frame; and
    generating a cohesive scene portion by:
    combining the first column of pixels with the first portion of the second column of pixels; and combining the second portion of the second column of pixels with the third column of pixels.

\* \* \* \* \*